US011191034B2

(12) United States Patent
Cha et al.

(10) Patent No.: US 11,191,034 B2
(45) Date of Patent: Nov. 30, 2021

(54) ELECTRONIC DEVICE FOR BACKING OFF TRANSMISSION POWER BASED ON SAR AND OPERATION METHOD THEREOF

(71) Applicant: SAMSUNG ELECTRONICS CO., LTD., Suwon-si (KR)

(72) Inventors: Jaemoon Cha, Suwon-si (KR); Yeonjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/907,654

(22) Filed: Jun. 22, 2020

(65) Prior Publication Data

US 2021/0051599 A1 Feb. 18, 2021

(30) Foreign Application Priority Data

Aug. 13, 2019 (KR) .......................... 10-2019-0098901

(51) Int. Cl.
*H04W 52/18* (2009.01)
*H04B 17/10* (2015.01)

(52) U.S. Cl.
CPC .......... *H04W 52/18* (2013.01); *H04B 17/104* (2015.01)

(58) Field of Classification Search
CPC ............................ H04W 52/18; H04B 17/104
USPC ..................................................... 455/522, 69
See application file for complete search history.

(56) References Cited

U.S. PATENT DOCUMENTS

| 8,565,205 B2* | 10/2013 | Ho | ....................... | H04W 52/365 |
| | | | | 370/338 |
| 9,491,706 B2* | 11/2016 | Thorson | .............. | H04W 52/367 |
| 9,596,653 B2* | 3/2017 | Black | ....................... | H04L 43/04 |
| 9,778,080 B2* | 10/2017 | Garvey, III | ............ | G01D 18/00 |
| 9,785,174 B2* | 10/2017 | Khawand | ................. | G05F 3/02 |

(Continued)

FOREIGN PATENT DOCUMENTS

| KR | 10-0693580 | 3/2007 |
| KR | 10-2017-0037924 | 4/2017 |

(Continued)

OTHER PUBLICATIONS

Search Report and Written Opinion dated Sep. 17, 2020 in counterpart International Patent Application No. PCT/KR2020/008115.

*Primary Examiner* — Hai V Nguyen
(74) *Attorney, Agent, or Firm* — Nixon & Vanderhye P.C.

(57) ABSTRACT

An electronic device may include: a memory storing a plurality of antenna configurations, at least one communication processor configured to support at least one network communication, at least one antenna configured to transmit at least one communication signal corresponding to the at least one network communication, and at least one antenna-tuning circuit configured to adjust a resonance characteristic of the at least one antenna, wherein the at least one communication processor is configured to: identify a cumulative specific absorption rate (SAR) value associated with emission of the at least one communication signal based on an antenna configuration of the at least one antenna-tuning circuit among the plurality of antenna configurations; and adjust a transmission strength of a communication signal corresponding to at least one of the at least one network communication based on the cumulative SAR value satisfying a designated condition.

18 Claims, 25 Drawing Sheets

(56) References Cited

U.S. PATENT DOCUMENTS

| | | | | |
|---|---|---|---|---|
| 9,853,748 B2* | 12/2017 | Prendergast | H04B 17/00 |
| 9,865,897 B2* | 1/2018 | Maleki | H01M 10/0431 |
| 9,949,210 B2* | 4/2018 | Black | H04W 4/02 |
| 10,136,395 B1* | 11/2018 | Koshy | H04W 52/226 |
| 10,148,304 B2* | 12/2018 | Chang | H04W 52/367 |
| 10,175,070 B2* | 1/2019 | Mann | G01D 18/00 |
| 10,218,403 B2* | 2/2019 | Koshy | H04W 52/281 |
| 10,224,974 B2* | 3/2019 | Mercer | H04B 17/102 |
| 10,326,486 B2* | 6/2019 | Koshy | H04B 17/21 |
| 10,826,550 B2* | 11/2020 | Choi | H04B 1/3838 |
| 10,893,488 B2* | 1/2021 | Khawand | H04B 1/3838 |
| 2012/0032678 A1* | 2/2012 | Vaughan, Jr. | A61B 5/0044 324/318 |
| 2012/0147801 A1* | 6/2012 | Ho | H04W 52/365 370/311 |
| 2012/0172079 A1* | 7/2012 | Baldemair | H04W 52/365 455/522 |
| 2012/0178494 A1* | 7/2012 | Haim | H04W 52/365 455/522 |
| 2012/0270519 A1* | 10/2012 | Ngai | H04W 52/228 455/404.1 |
| 2012/0270592 A1* | 10/2012 | Ngai | H04W 52/34 455/522 |
| 2013/0169348 A1* | 7/2013 | Shi | H04B 1/3838 327/517 |
| 2014/0274188 A1* | 9/2014 | Thorson | H04W 52/04 455/522 |
| 2014/0274189 A1* | 9/2014 | Moller | H04W 52/367 455/522 |
| 2014/0307570 A1* | 10/2014 | Hong | H04B 1/3838 370/252 |
| 2014/0315592 A1* | 10/2014 | Schlub | H04B 1/3838 455/522 |
| 2014/0324367 A1* | 10/2014 | Garvey, III | G01D 18/00 702/56 |
| 2014/0357207 A1* | 12/2014 | Ma | H04B 1/3838 455/127.2 |
| 2014/0357313 A1* | 12/2014 | Mercer | H04B 17/102 455/552.1 |
| 2014/0370929 A1* | 12/2014 | Khawand | H04W 52/367 455/522 |
| 2015/0022206 A1* | 1/2015 | Adolf | G01R 33/288 324/309 |
| 2015/0031408 A1* | 1/2015 | Kalla | H04W 52/38 455/522 |
| 2015/0199042 A1* | 7/2015 | Standing | G06F 3/044 345/174 |
| 2015/0200444 A1* | 7/2015 | Mercer | H04B 1/04 343/702 |
| 2015/0201387 A1* | 7/2015 | Khawand | H04W 52/288 455/452.1 |
| 2015/0357702 A1* | 12/2015 | Tani | H01Q 1/243 343/904 |
| 2016/0049978 A1* | 2/2016 | Mercer | H04W 24/06 455/115.1 |
| 2016/0064832 A1* | 3/2016 | Shin | H01Q 1/243 343/702 |
| 2016/0098053 A1* | 4/2016 | Khawand | H04W 52/367 307/116 |
| 2016/0164563 A1* | 6/2016 | Khawand | H04W 52/221 455/127.2 |
| 2016/0345275 A1 | 11/2016 | Zhang et al. | |
| 2016/0366015 A1* | 12/2016 | Prendergast | G05B 19/02 |
| 2017/0205478 A1* | 7/2017 | Brinker | G16H 40/63 |
| 2017/0250718 A1* | 8/2017 | Choi | H04B 1/3838 |
| 2017/0332333 A1 | 11/2017 | Santhanam et al. | |
| 2017/0356771 A1* | 12/2017 | Mann | G01D 18/00 |
| 2018/0316379 A1* | 11/2018 | Chang | H04B 1/401 |
| 2019/0036563 A1* | 1/2019 | Koshy | H04W 52/267 |
| 2019/0044560 A1* | 2/2019 | Koshy | H04B 17/21 |
| 2020/0195290 A1* | 6/2020 | Khawand | H04W 52/146 |

FOREIGN PATENT DOCUMENTS

| | | |
|---|---|---|
| WO | 2014/161356 | 10/2014 |
| WO | 2018/112430 | 6/2018 |

* cited by examiner

| aperture tuner set value | impedance tuner set value | band1 radiation power/ conduction power | band3 radiation power/ conduction power | B1+B3 CA | calculated SAR(mW/g) Tx Power (23.5dBm) | actual SAR(mW/g) Tx Power (23.5dBm) |
|---|---|---|---|---|---|---|
| 1 | a | 0.9 | 0.4 | 0.9 | 1.2 | 1.20 |
|   | b | 0.8 | 0.75 | 0.8 | 1.2 | 1.07 |
|   | c | 0.7 | 0.8 | 0.7 | 1.2 | 0.93 |
|   | d | 0.6 | 0.7 | 0.6 | 1.2 | 0.80 |
|   | e | 0.5 | 0.6 | 0.5 | 1.2 | 0.67 |
| 2 | a | 0.4 | 0.9 | 0.4 | 1.2 | 0.53 |
|   | b | 0.3 | 0.8 | 0.3 | 1.2 | 0.40 |
|   | c | 0.2 | 0.7 | 0.2 | 1.2 | 0.27 |
|   | d | 0.1 | 0.6 | 0.1 | 1.2 | 0.13 |
|   | e | 0 | 0.5 | 0 | 1.2 | 0.00 |
| 3 | a | 0.4 | 0.4 | 0.4 | 1.2 | 0.53 |
|   | b | 0.7 | 0.3 | 0.7 | 1.2 | 0.93 |
|   | c | 0.8 | 0.2 | 0.8 | 1.2 | 1.07 |
|   | d | 0.7 | 0.1 | 0.7 | 1.2 | 0.93 |
|   | e | 0.6 | 0 | 0.6 | 1.2 | 0.80 |

FIG.10A

| aperture tuner set value | impedance tuner set value | band1 radiation power/ conduction power | band1 rx frequency antenna loss(dB) | calculated SAR(mW/g) Tx Power (23.5dBm) | actual SAR(mW/g) Tx Power (23.5dBm) |
|---|---|---|---|---|---|
| 1 | a | 0.9 | 5 | 1.2 | 1.20 |
|   | b | 0.8 | 3 | 1.2 | 1.07 |
|   | c | 0.7 | 4 | 1.2 | 0.93 |
|   | d | 0.6 | 1 | 1.2 | 0.80 |
|   | e | 0.5 | 2 | 1.2 | 0.67 |
| 2 | a | 0.4 | 7 | 1.2 | 0.53 |
|   | b | 0.3 | 8 | 1.2 | 0.40 |
|   | c | 0.2 | 9 | 1.2 | 0.27 |
|   | d | 0.1 | 3 | 1.2 | 0.13 |
|   | e | 0 | 2 | 1.2 | 0.00 |
| 3 | a | 0.4 | 1 | 1.2 | 0.53 |
|   | b | 0.7 | 4 | 1.2 | 0.93 |
|   | c | 0.8 | 1 | 1.2 | 1.07 |
|   | d | 0.7 | 6 | 1.2 | 0.93 |
|   | e | 0.6 | 4 | 1.2 | 0.80 |

FIG.10B

ELECTRONIC DEVICE FOR BACKING OFF TRANSMISSION POWER BASED ON SAR AND OPERATION METHOD THEREOF

CROSS-REFERENCE TO RELATED APPLICATION

This application is based on and claims priority under 35 U.S.C. § 119 to Korean Patent Application No. 10-2019-0098901, filed on Aug. 13, 2019, in the Korean Intellectual Property Office, the disclosure of which is incorporated by reference herein in its entirety.

BACKGROUND

Field

The disclosure relates to an electronic device that backs off transmission power based on a specific absorption rate (SAR) and an operation method thereof.

Description of Related Art

A user equipment (UE) may transmit electromagnetic waves for data transmission or reception with a base station. Electromagnetic waves radiated from the UE may negatively affect human bodies, and many domestic and international institutes are trying to reduce the negative influence of electromagnetic waves on human bodies. For example, a specific absorption rate (SAR) is a numerical value indicating the degree of absorption of electromagnetic waves emitted from a mobile communication terminal and absorbed by a human body. An SAR is expressed in KW/g (or mW/g), and may indicate the amount of power (KW, W, or mW) absorbed per 1 g of body weight. The issue of harmful influence of electromagnetic waves has recently come to the fore, and thus standards for limiting an SAR associated with a mobile communication terminal have been defined.

A UE may back off transmission power if an SAR estimated based on the transmission power is expected to exceed a threshold value. For example, if it is identified that a predetermined event (e.g., grip, hot-spot, proxy) has occurred, a UE may transmit a communication signal at a backoff power corresponding to the corresponding event.

As described above, if an estimated SAR at a predetermined point in time is expected to exceed a threshold SAR, an algorithm that backs off transmission power may operate in a user equipment (UE). However, technology that backs off transmission power based on the total amount of a cumulative SAR value during a predetermined period of time has not been provided. In addition to an SAR that instantaneously affects the body, the average SAR that affects the body needs to be taken into consideration. In addition, SARs for respective antenna configurations have never been considered, and thus there may be the possibility of determining the SAR to be larger than the actually occurring SAR.

SUMMARY

Embodiments of the disclosure provide an electronic device capable of identifying whether to back off transmission power based on a cumulative SAR value identified based on an antenna configuration and an operation method thereof.

According to various example embodiments, an electronic device may include: a memory storing a plurality of antenna configurations, at least one communication processor configured to support at least one network communication, at least one antenna configured to transmit at least one communication signal corresponding to the at least one network communication, and at least one antenna-tuning circuit configured to adjust a resonance characteristic of the at least one antenna, wherein the at least one communication processor is configured to: identify a cumulative SAR value associated with emission of the at least one communication signal based on an antenna configuration of the at least one antenna-tuning circuit among the plurality of antenna configurations; and adjust a transmission strength of a communication signal corresponding to at least one of the at least one network communication based on the cumulative SAR value satisfying a designated condition.

According to various example embodiments, an operation method of an electronic device, which includes a memory storing a plurality of antenna configurations, at least one communication processor configured to support at least one network communication, at least one antenna configured to transmit at least one communication signal corresponding to the at least one network communication, and at least one antenna-tuning circuit configured to adjust the resonance characteristic of the at least one antenna, the method including: identifying, by the at least one communication processor, a cumulative SAR value associated with emission of the at least one communication signal based on an antenna configuration of the at least one antenna-tuning circuit among the plurality of antenna configurations; and adjusting, by the at least one communication processor, a transmission strength of a communication signal corresponding to at least one of the at least one network communication based on the cumulative SAR value satisfying a designated condition.

According to various example embodiments, an electronic device may include: a memory storing a plurality of antenna configurations, at least one communication processor configured to support at least one network communication, at least one antenna configured to transmit at least one communication signal corresponding to the at least one network communication, and at least one antenna-tuning circuit configured to adjust a resonance characteristic of the at least one antenna, wherein the at least one communication processor is configured to: identify a first target transmission strength of the at least one communication signal; and based on an antenna configuration of the antenna-tuning circuit being controlled to be a first antenna configuration among the plurality of antenna configurations, performing control to transmit at least one first communication signal based on the first target transmission strength during a first period of time, and performing control to transmit at least one second communication signal based on a backoff signal strength after the first period of time. Based on an antenna configuration of the antenna-tuning circuit being controlled to be a second antenna configuration among the plurality of antenna configurations, the at least one communication processor is configured to perform control to transmit at least one third communication signal based on the first target transmission strength during a second period of time and to perform control to transmit at least one fourth communication signal based on a backoff signal strength after the second period of time.

According to various example embodiments, an electronic device that is capable of identifying whether to back off transmission power based on a cumulative SAR value identified based on an antenna configuration, and an operation method thereof are provided. Accordingly, an average SAR does not exceed a threshold average value, and thus user safety may be improved. In addition, by taking into consideration an SAR based on an antenna configuration, the point in time of performing backoff of the transmission strength of a communication signal may be delayed.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 10A is a table illustrating example antenna efficiency and an SAR according to various embodiments;

FIG. 10B is a table illustrating example antenna efficiency and an SAR according to various embodiments;

DETAILED DESCRIPTION

Figure 1:
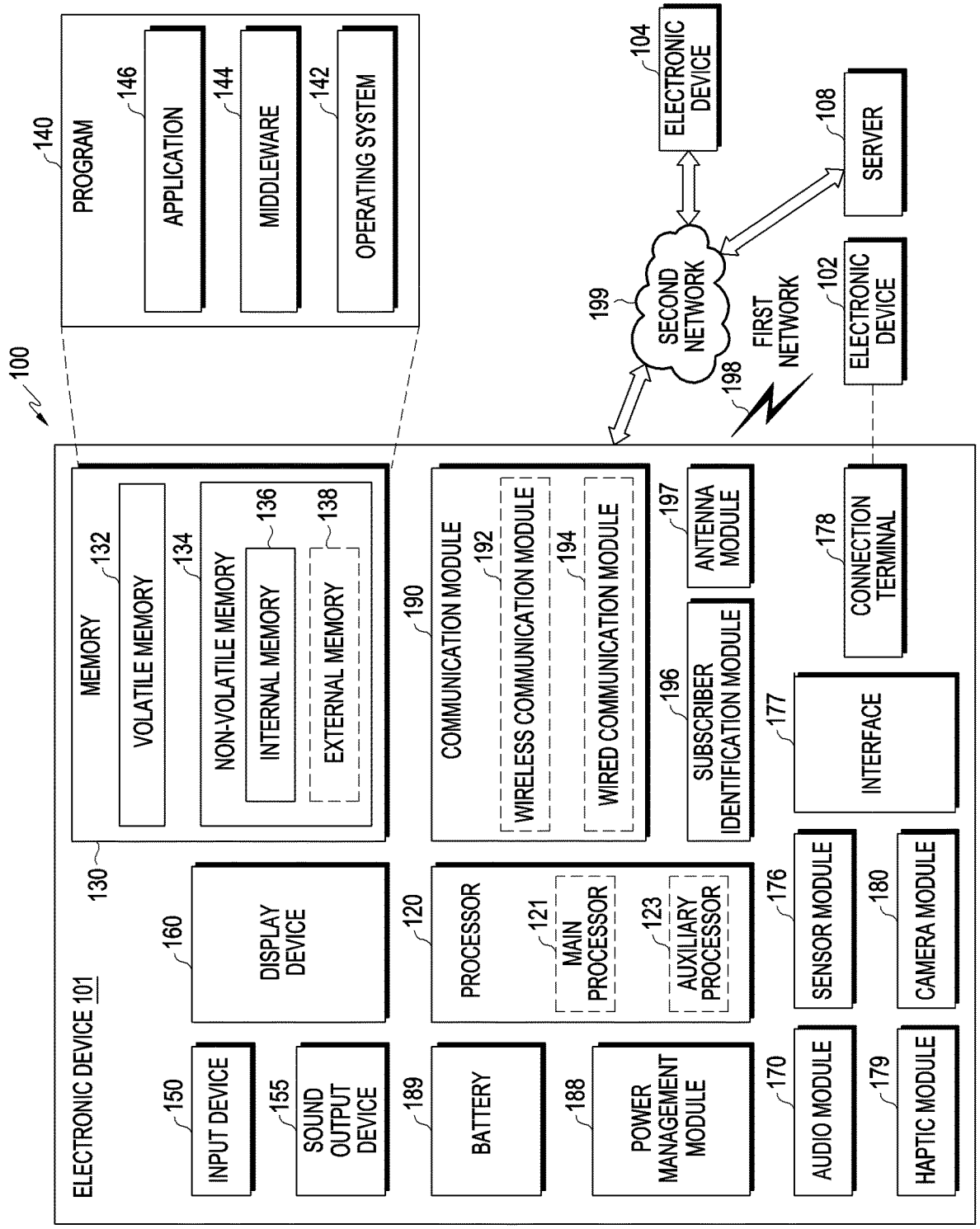
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
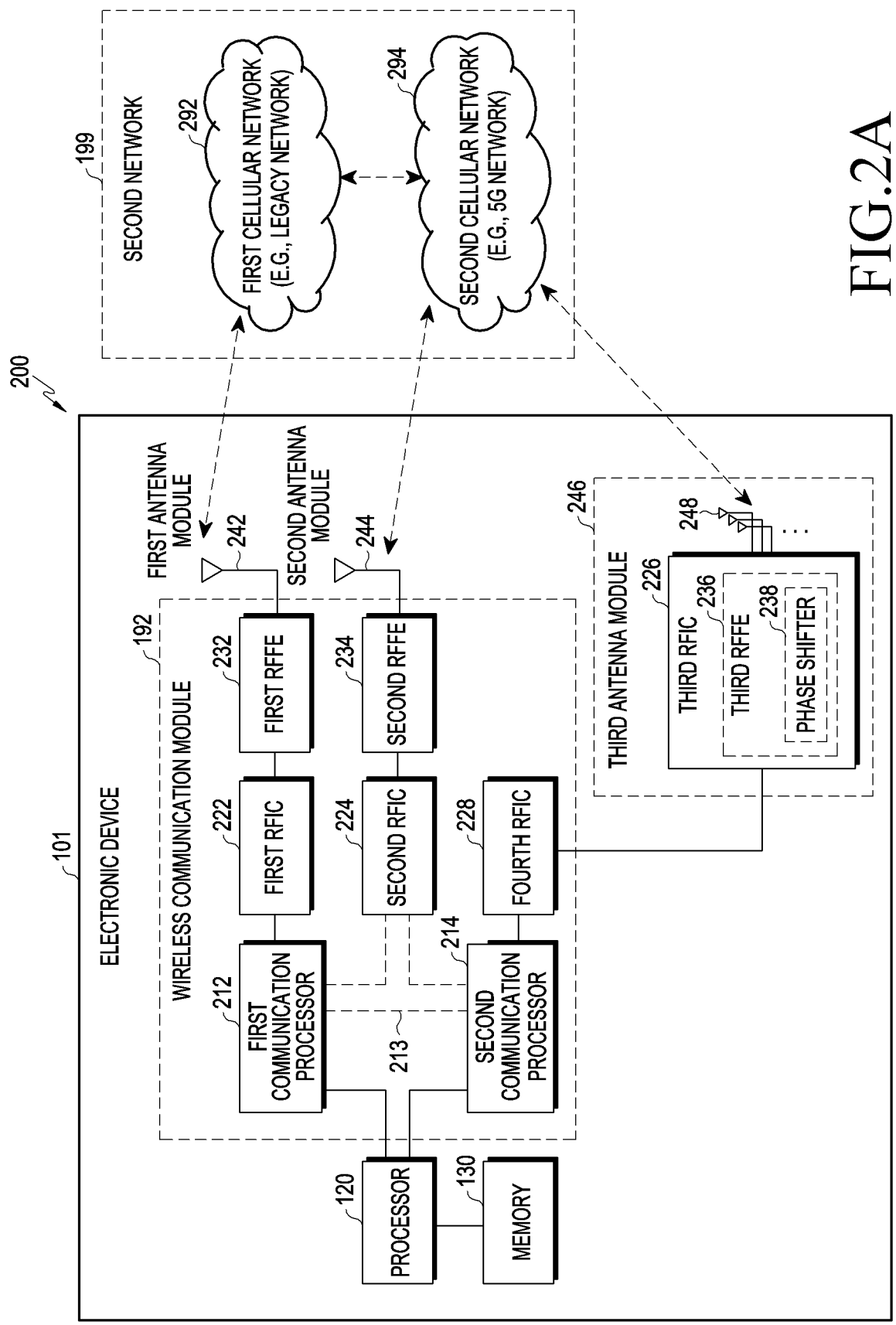
FIG. 2A is a block diagram illustrating an example electronic device for supporting network communication and 5G network communication according to various embodiments.

FIG. 2A is a block diagram 200 illustrating the electronic device 101 for supporting network communication and 5G network communication according to various embodiments. Referring to FIG. 2A, the electronic device 101 may include a first communication processor (e.g., including processing circuitry) 212, a second communication processor (e.g., including processing circuitry) 214, a first radio-frequency integrated circuit (RFIC) 222, a second RFIC 224, a third RFIC 226, a fourth RFIC 228, a first radio-frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to another embodiment, the fourth RFIC 228 may be omitted, or may be included as a part of the third RFIC 226.

The first communication processor 212 may include various processing circuitry and establish a communication channel of a band to be used for wireless communication with the first network 292, and may support legacy network communication via the established communication channel. According to various embodiments, the first network may be a legacy network including a $2^{nd}$-generation (2G), $3^{rd}$-generation (3G), $4^{th}$-generation (4G), or long-term-evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to various embodiments, the second network 294 may be a 5G network defined in 3GPP. Additionally, according to an embodiment, the first communication processor 212 or the second communication processor 214 may establish a communication channel corresponding to another designated band (e.g., 6 GHz or less) among bands to be used for wireless communication with the second network 294, and may support 5G network communication via the established channel.

The first communication processor 212 may perform data transmission or reception with the second communication processor 214. For example, data that has been classified to be transmitted via the second cellular network 294 may be changed to be transmitted via the first cellular network 292. In this instance, the first communication processor 212 may receive transmission data from the second communication processor 214.

For example, the first communication processor 212 may perform data transmission or reception with the second communication processor 214 via an inter-processor interface 213. The inter-processor interface 213 may be implemented as, for example, a universal asynchronous receiver/transmitter (UART) (e.g., a high speed-UART (HS-UART)) interface or a peripheral component interconnect bus express (PCIe) interface, but the type of interface is not limited thereto. Alternatively, the first communication processor 212 and the second communication processor 214 may exchange control information and packet data information using, for example, shared memory. The first communication processor 212 may perform transmission or reception of various kinds of information such as sensing information, information associated with output strength, and resource block (RB) allocation information, with the second communication processor 214.

Depending on the implementation, the first communication processor 212 may not be directly connected to the second communication processor 214. In this instance, the first communication processor 212 may perform data transmission or reception with the second communication processor 214 via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. Alternatively, the first communication processor 212 and the second communication processor 214 may exchange control information and packet data information via the processor 120 (e.g., an application processor) and shared memory.

Figure 2B:
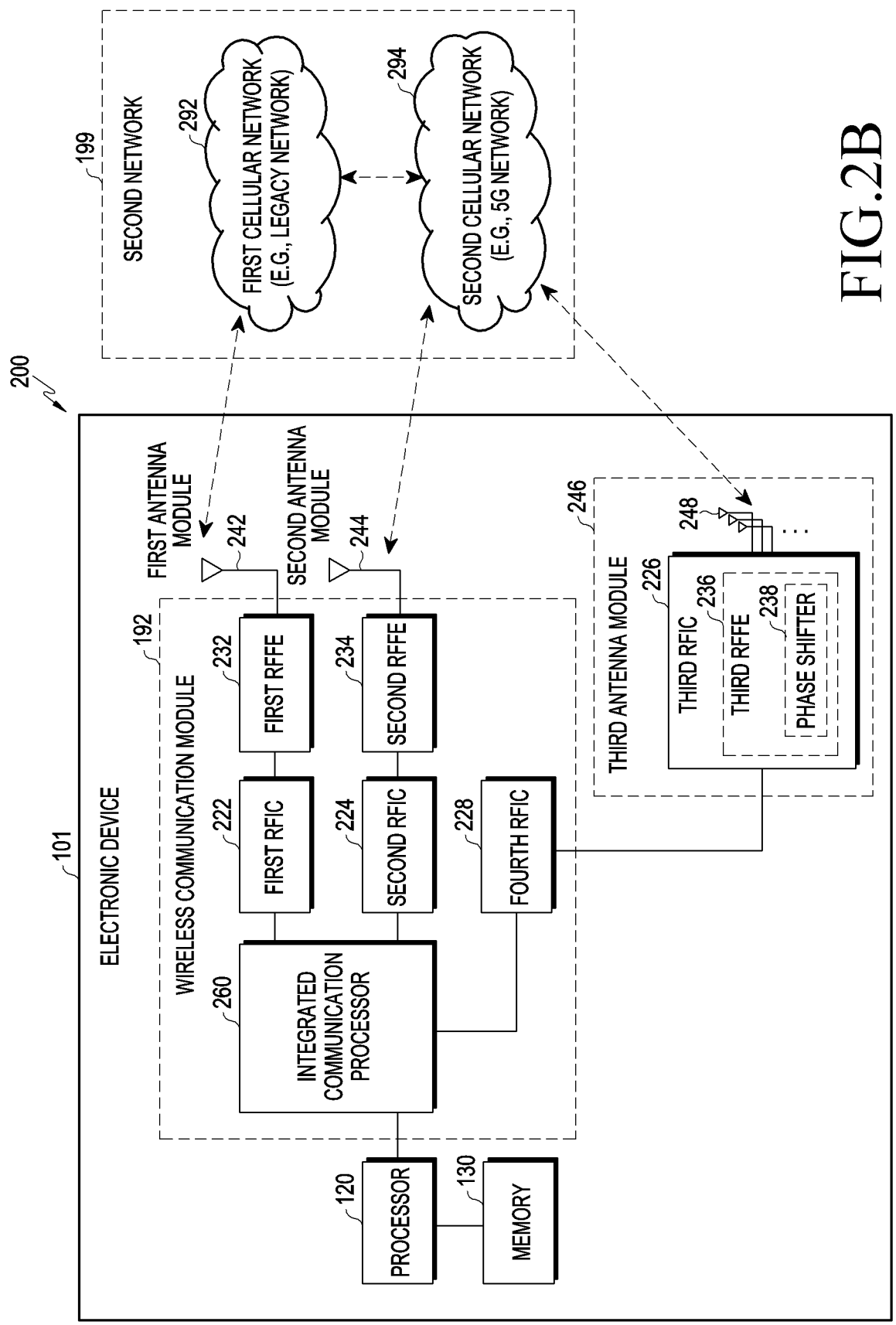
FIG. 2B is a block diagram illustrating an example electronic device for supporting network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, the sub-processor 123, or the communication module 190. For example, as illustrated in FIG. 2B, an integrated communication processor 260 may include various processing circuitry and support both a function for communication with a first cellular network and a function for communication with a second cellular network.

In the case of transmission, the first RFIC 222 may convert a baseband signal generated by the first communication processor 212 into a radio-frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the signal may be processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal is obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor selected from among the first communication processor 212 or the second communication processor 214.

The third RFIC 226 may convert a baseband signal generated by the second communication processor 214 into an RF signal (hereinafter, a 5G Above 6 RF signal) of a 5G Above 6 band (e.g., approximately 6 GHz to 60 GHz) to be used in the second network 294 (e.g., a 5G network). In the case of reception, a 5G Above 6 RF signal is received from the second network 294 (e.g., a 5G network) via an antenna (e.g., the antenna 248), and may be preprocessed by the third RFFE 236. The third RFIC 226 may convert the preprocessed 5G Above 6 RF signal into a baseband signal so that the signal may be processed by the second communication processor 214. According to an embodiment, the third RFFE 236 may be implemented as a part of the third RFIC 226.

The electronic device 101, according to an embodiment, may include the fourth RFIC 228, separately from the third RFIC 226 or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above 6 RF signal. In the case of reception, a 5G Above 6 RF signal may be received from the second network 294 (e.g., a 5G network) via an antenna (e.g., the antenna 248), and may be converted into an IF signal by the third RFFE 226. The fourth RFIC 228 may convert the IF signal into a baseband signal so that the second communication processor 214 may process the signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 or the second antenna module 244 may be omitted, or may be combined with another antenna module so as to process RF signals in a plurality of corresponding bands.

According to an embodiment, the third RFIC 226 and the antenna 248 may be disposed on the same substrate, and may form a third antenna module 246. For example, the wireless communication module 192 or the processor 120 may be disposed on a first substrate (e.g., a main PCB). In this instance, the third RFIC 226 is disposed on a part (e.g., a lower part) of a second substrate (e.g., a sub PCB) different from the first substrate, and the antenna 248 is disposed on another part (e.g., an upper part), so that the third antenna module 246 may be formed by disposing the third RFIC 226 and the antenna 248 on the same substrate, the length of a transmission line therebetween may be reduced. For example, this may reduce loss (e.g., attenuation) of a high-frequency band signal (e.g., approximate 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to the plurality of antenna elements. In the case of transmission, each of the plurality of phase shifters 238 may shift the phase of a 5G Above 6RF signal to be transmitted outside the electronic device 101 (e.g., a base station of a 5G network) via a corresponding antenna element. In the case of reception, each of the plurality of phase shifters 238 may shift the phase of a 5G Above 6 RF signal received from the outside via a corresponding antenna element into the same or substantially the same phase. This may enable transmission or reception via beamforming between the electronic device 101 and the outside.

The second network 294 (e.g., a 5G network) may operate independently (Standalone (SA)) from the first network 292 (e.g., a legacy network), or may operate by being connected thereto (Non-standalone (NSA)). For example, in the 5G network, only an access network (e.g., a 5G radio access network (RAN) or next-generation RAN (NG RAN)) may exist, and a core network (e.g., next-generation core (NGC)) may not exist. In this instance, the electronic device 101 may access the access network of the 5G network, and may access an external network (e.g., the Internet) under the control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
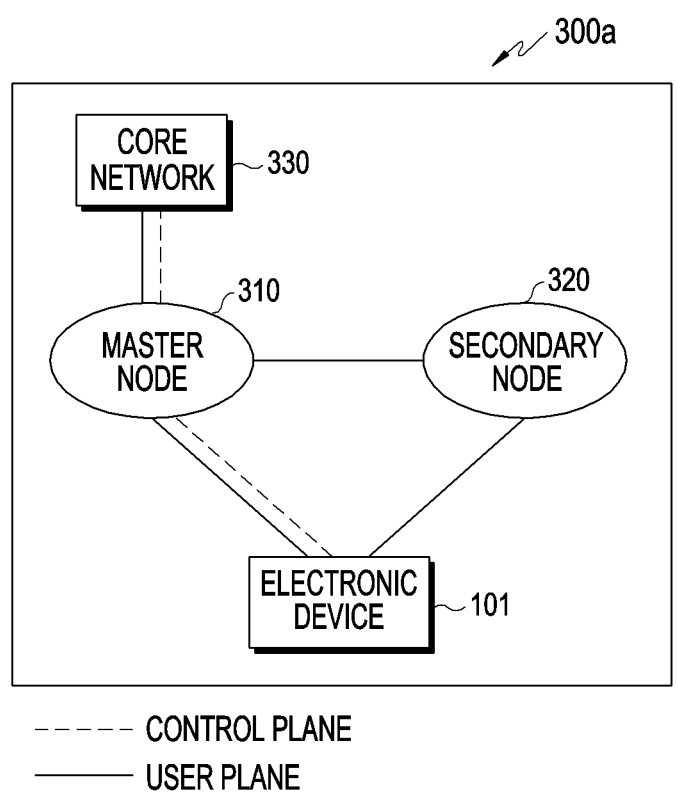
FIG. 3 is a diagram illustrating an example wireless communication system that provides a legacy communication and/or 5G communication network according to various embodiments.

FIG. 3 is a diagram illustrating an example wireless communication system that provides a legacy communication and/or 5G communication network according to various embodiments. Referring to FIG. 3, a network environment 300a may include at least one of a legacy network and a 5G network. The legacy network, for example, may include a 3GPP-standard-based 4G or LTE base station (e.g., an eNodeB (eNB)) that supports radio access to the electronic device 101, and an evolved packet core (EPC) that manages 4G communication. The 5G network, for example, may include a new radio (NR) base station (e.g., a gNodeB (gNB)) that supports radio access to the electronic device 101 and a 5$^{th}$-generation core (5GC) that manages 5G communication of the electronic device 101.

According to various embodiments, the electronic device 101 may transmit or receive a control message and user data via legacy communication and/or 5G communication. The control message, for example, may include a message related to at least one of security control, bearer setup, authentication, registration, or mobility management in association with the electronic device 101 The user data, for example, may refer to user data excluding a control message transmitted or received between the electronic device 101 and the core network 330 (e.g., an EPC).

Referring to FIG. 3, the electronic device 101 according to an embodiment may perform transmission or reception of at least one of a control message or user data with at least a part of the 5G network (e.g., an NR base station or a 5GC), using at least a part of the legacy network (e.g., an LTE base station or an EPC).

According to various embodiments, the network environment 300a may include a network environment that provides wireless communication dual connectivity (DC) to an LTE base station and an NR base station, and performs transmission or reception of a control message with the electronic device 101 via the core network 330 corresponding to one of the EPC or 5GC.

According to various embodiments, in a DC environment, one of an LTE base station or an NR base station may operate as a master node (MN) 310, and the other may operate as a secondary node (SN) 320. The MN 310 may be connected to the core network 330, and may transmit or receive a control message. The MN 310 and the SN 320 may be connected via a network interface, and may perform transmission or reception of a message related to radio resource management (e.g., a communication channel) therebetween.

According to various embodiments, the MN 310 may be implemented as the LTE base station 340, the SN 320 may be implemented as an NR base station, and the core network 330 may be implemented as an EPC. For example, a control message may be transmitted or received via the LTE base station and the EPC, and user data may be transmitted or received via at least one of the LTE base station or the NR base station.

According to various embodiments, the MN 310 may be implemented as an NR base station, the SN 320 may be implemented as an LTE base station, and the core network 330 may be implemented as a 5GC. For example, a control message may be transmitted or received via the NR base station and the 5GC, and user data may be transmitted or received via at least one of the LTE base station or NR base station.

According to various embodiments, the electronic device 101 may be registered with at least one of the EPC or 5GC, and may transmit or receive a control message.

According to various embodiments, the EPC or 5GC may interwork so as to manage communication of the electronic device 101. For example, the movement information of the electronic device 101 may be transmitted or received via an interface between the EPC and the 5GC.

As described above, dual connectivity via an LTE base station and an NR base station may be referred to as an E-UTRA new-radio dual connectivity (EN-DC). MR DC may be applicable in various ways, in addition to the EN-DC. For example, both a first network and a second network based on MR DC are related to LTE communication, and the second network may be a network corresponding to a small cell of a predetermined frequency. For example, the first network may be a network that is connected to a 5G core network but uses a wireless area based on LTE communication, and the second network may be a network related to 5G communication. In an example, both the first network and the second network based on the MR DC are related to 5G, the first network corresponds to a frequency band less than 6 GHz (e.g., below 6), and the second network corresponds to a frequency band greater than or equal to 6 GHz (e.g., over 6). In addition to the above-described examples, those skilled in the art may easily understand that a network to which dual connectivity is applicable is also applicable to various embodiments.

Figure 4A:
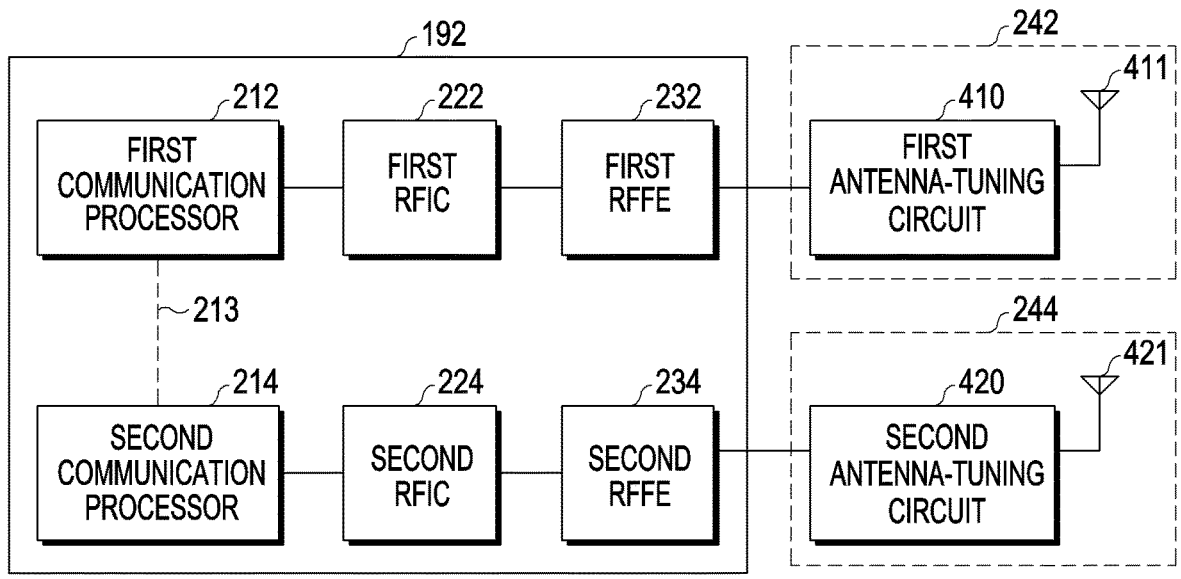
FIG. 4A is a block diagram illustrating an example antenna-tuning circuit according to various embodiments.
Figure 4B:
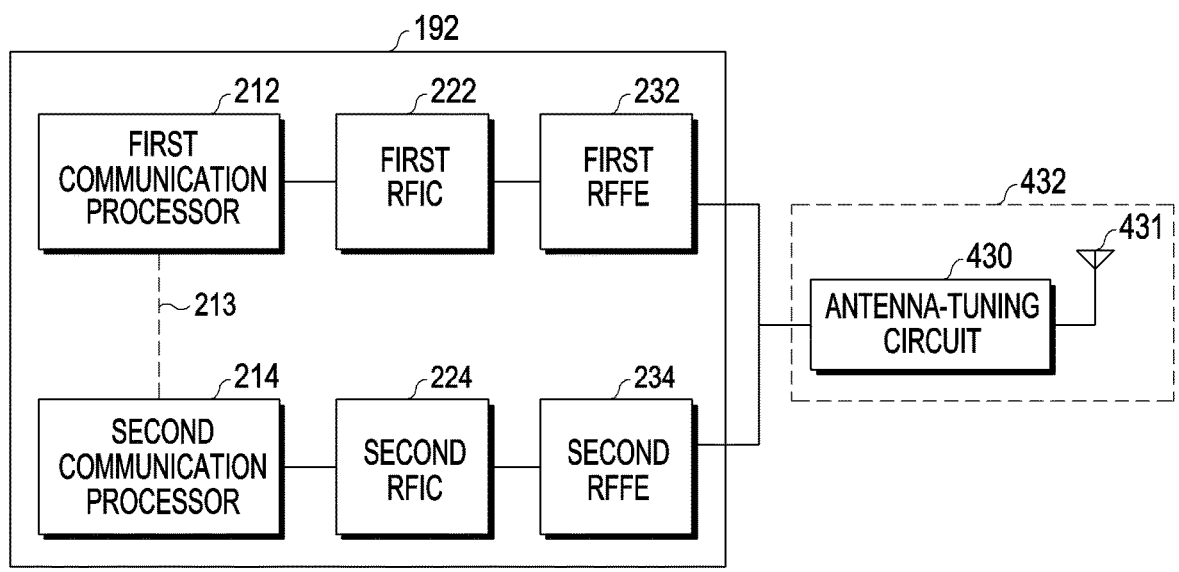
FIG. 4B is a block diagram illustrating an example antenna-tuning circuit according to various embodiments.
Figure 4C:
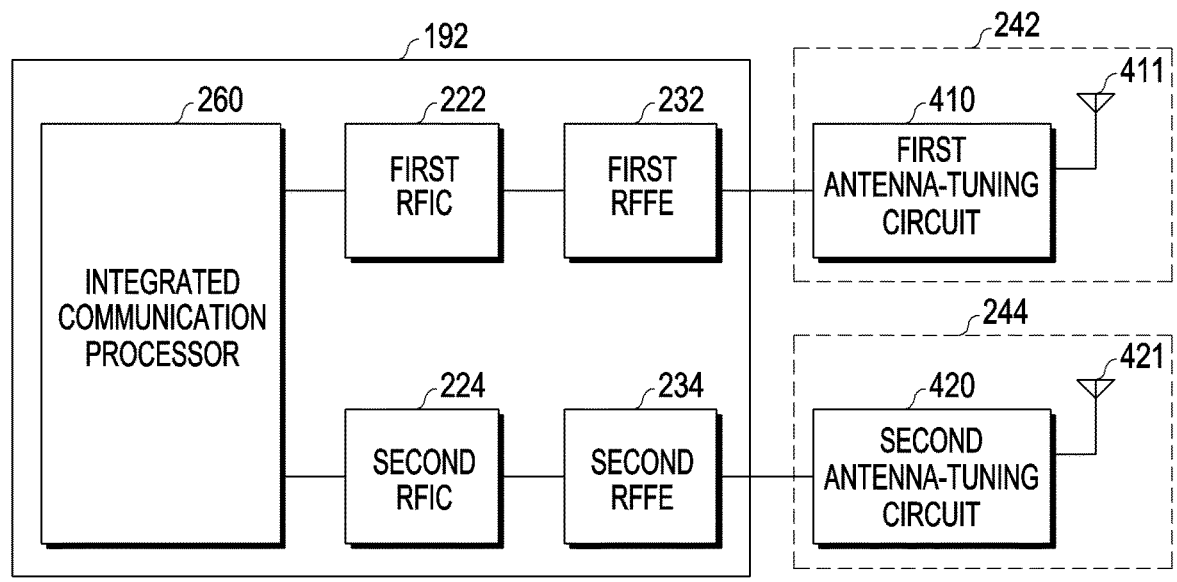
FIG. 4C is a block diagram illustrating an example antenna-tuning circuit according to various embodiments.
Figure 4D:
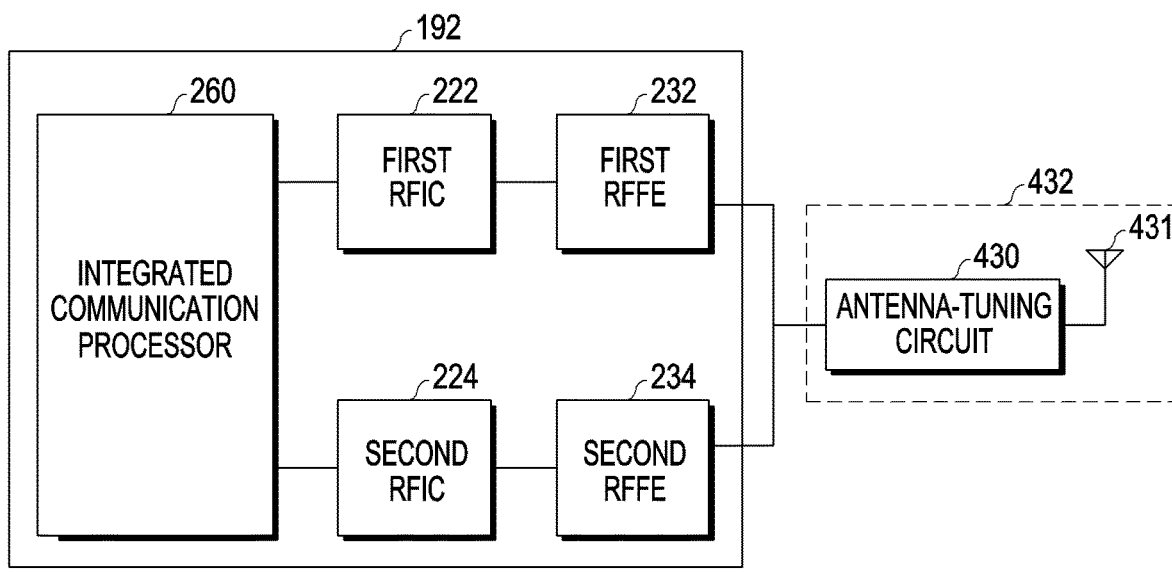
FIG. 4D is a block diagram illustrating an example antenna-tuning circuit according to various embodiments.

FIG. 4A is a block diagram illustrating an example antenna-tuning circuit according to various embodiments, FIG. 4B is a block diagram illustrating an example antenna-tuning circuit according to various embodiments, FIG. 4C is a block diagram illustrating an example antenna-tuning circuit according to various embodiments, and FIG. 4D is a block diagram illustrating an example antenna-tuning circuit according to various embodiments.

Referring to FIG. 4A, according to various embodiments, the wireless communication module 192 may include at least one of the first communication processor 212, the second communication processor 214, the first RFIC 222, the second RFIC 224, the first RFFE 232, or the second RFFE 234. Although FIG. 4A illustrates some of the components of the wireless communication module 192 of FIG. 2A, this is merely for ease of description. According to various embodiments, the wireless communication module 192 of FIG. 4A may be implemented to include substantially the same components as those of the wireless communication module 192 of FIG. 2A, or may be implemented to include the components illustrated in FIG. 4A. The first communication processor 212 and the second communication processor 214 may be connected via the inter-processor interface 213, and may transmit or receive information.

According to various embodiments, a first antenna-tuning circuit 410 may be connected to the first RFFE 232, and a second antenna-tuning circuit 420 may be connected to the second RFFE 234. At least one first antenna 411 may be connected to the first antenna-tuning circuit 410, and at least one second antenna 421 may be connected to the second antenna-tuning circuit 420. The first antenna-tuning circuit 410 may include at least one aperture-tuning circuit and/or at least one impedance-tuning circuit. The second antenna-tuning circuit 420 may include at least one aperture-tuning circuit and/or at least one impedance-tuning circuit. The antenna configuration of the first antenna-tuning circuit 410 may include the setting of each of the at least one aperture-tuning circuit and/or the setting of each of the at least one impedance-tuning circuit. The antenna configuration of the second antenna-tuning circuit 420 may include the setting of each of the at least one aperture-tuning circuit and/or the setting of each of the at least one impedance-tuning circuit. When the setting of each of the at least one aperture-tuning circuit and/or the setting of each of the at least one impedance-tuning circuit is changed, the resonance characteristic of an antenna may be changed. The setting of each of the at least one aperture-tuning circuit and/or the setting of each of the at least one impedance-tuning circuit may be stored in a memory (e.g., the memory 130 or a dedicated communication-processor memory). In the memory, a plurality of antenna configurations (e.g., a plurality of settings of at least one aperture-tuning circuit and/or a plurality of settings of at least one impedance-tuning circuit) may be stored.

According to various embodiments, the electronic device 101 may adjust an antenna configuration so that a communication signal is transmitted with an optimized emission efficiency. For example, the electronic device 101 may perform closed-loop control, and may identify the magnitude of forward power output via a power amplifier on a transmission side and the magnitude of backward power of a reflected wave. The electronic device 101 may determine an antenna configuration based on the ratio of forward power to backward power (or the ratio of incident power to reflected power). Determining an antenna configuration by performing closed loop control is merely an example, and the scheme for determining the antenna configuration is not limited thereto. According to various embodiments, the electronic device 101 may determine an antenna configuration corresponding to the common range of a plurality of headrooms (e.g., in the case of carrier aggregation (CA), a headroom for a TX configuration of a PCell, a headroom for an RX configuration of the PCell, and a headroom for an RX configuration of an SCell).

According to various embodiments, the electronic device 101 may determine an antenna configuration for the at least one first antenna 411, and may determine an antenna configuration for the at least one second antenna 412. In the embodiment of FIG. 4A, although it is illustrated that antenna-tuning circuits 410 and 420 are connected to the first RFFE 232 and the second RFFE 234, this is merely an example. Although not illustrated, the electronic device 101 may further include an antenna-tuning circuit configured to adjust the antenna configuration of an antenna (e.g., the antenna 248) for transmitting an RF signal in an Above 6 band (e.g., the range of approximately 6 GHz to 60 GHz) corresponding to the third RFIC 226.

Referring to FIG. 4B, the electronic device 101 according to various embodiments may include an antenna module 432 that includes at least one tuning circuit 430 and an antenna 431. The electronic device 101 may transmit at least one communication signal based on two different network communications via a shared antenna (e.g., the antenna 431). For example, the electronic device 101 may perform simultaneous transmission (e.g., 2tx (transmit)) in at least two adjacent bands via a shared antenna (e.g., the antenna 431). For example, the electronic device 101 may perform simultaneous transmission (e.g., 2tx (transmit)) in at least two non-adjacent bands via a shared antenna (e.g., the antenna 431). The electronic device 101 may perform control so that two network communications share a shared antenna (e.g., the antenna 431) in some bands of a DC band combination defined in the 3GPP standard (e.g., the B2/B66 band of LTE, the N5/N71 band of NR), and this may be called a "2TX-1 antenna". An example in which a plurality of network communications share an antenna is not limited. Since a plurality of network communication share an antenna (e.g., the antenna 431), they may share the antenna-tuning circuit 430. The antenna configuration that minimizes the amount of current consumed according to various embodiments may be determined to be the antenna configuration of the antenna-tuning circuit 430.

Referring to FIG. 4C, the electronic device 101 according to various embodiments may include the integrated communication processor 260. The antenna-tuning circuits 410 and 420 may be connected to the antennas 411 and 421, which correspond to a plurality of network communications supported by the integrated communication processor 260. Determining antenna configurations for the antenna-tuning circuits 410 and 420 of FIG. 4C may be substantially the same as or similar to the description provided with reference to FIG. 4A. Referring to FIG. 4D, the electronic device 101 according to various embodiments may include the integrated communication processor 260. The antenna-tuning circuit 430 may be connected to the antenna 431 shared by a plurality of network communications supported by the integrated communication processor 260. Determining the antenna configuration for the antenna-tuning circuit 430 of FIG. 4D may be substantially the same as or similar to the description provided with reference to FIG. 4B.

Figure 5A:
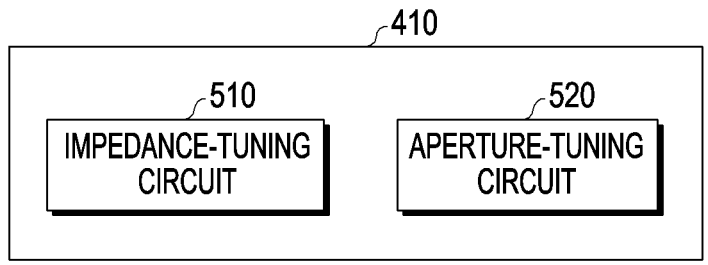
FIG. 5A is a block diagram illustrating an example antenna-tuning circuit according to various embodiments.
Figure 5B:
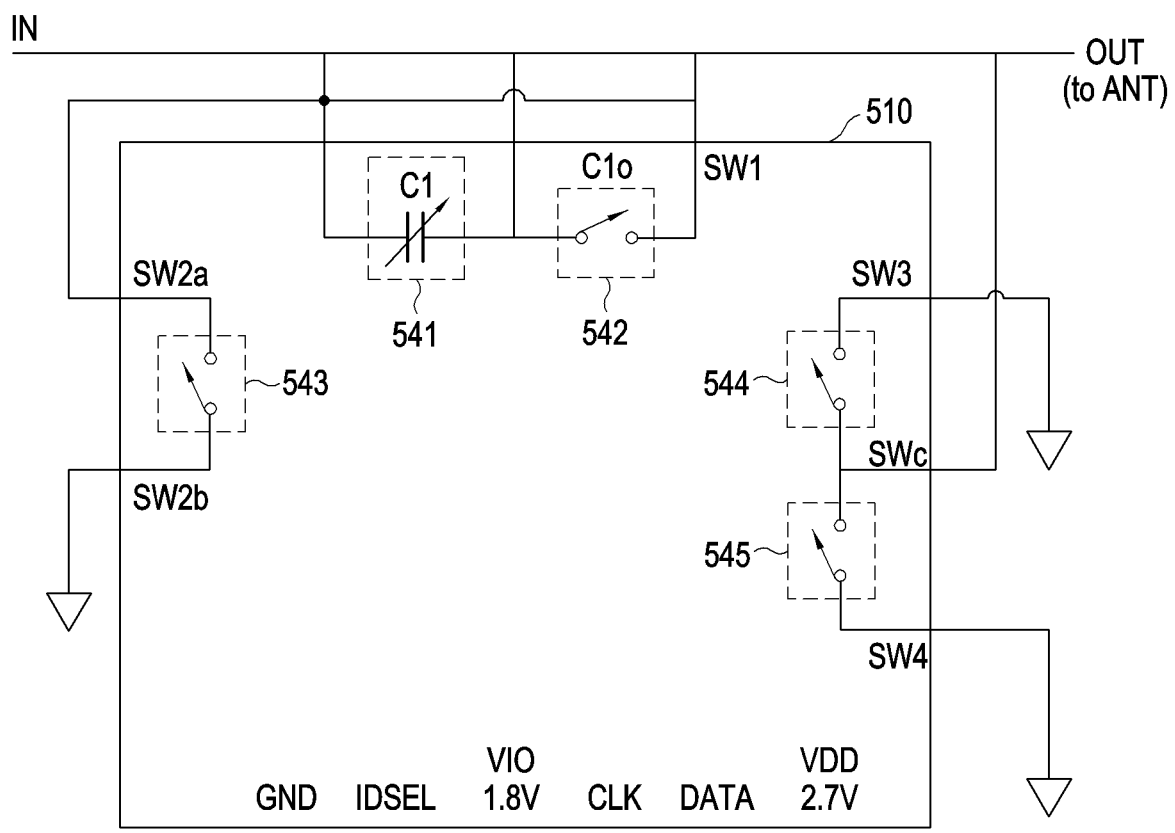
FIG. 5B is a circuit diagram illustrating an example antenna-tuning circuit according to various embodiments.
Figure 5C:
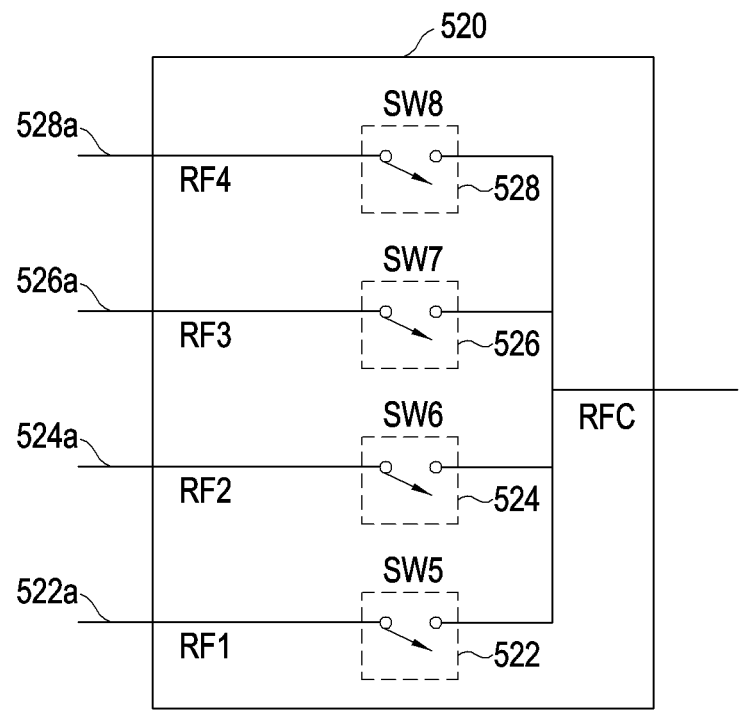
FIG. 5C is a circuit diagram illustrating an example antenna-tuning circuit according to various embodiments.
Figure 5D:
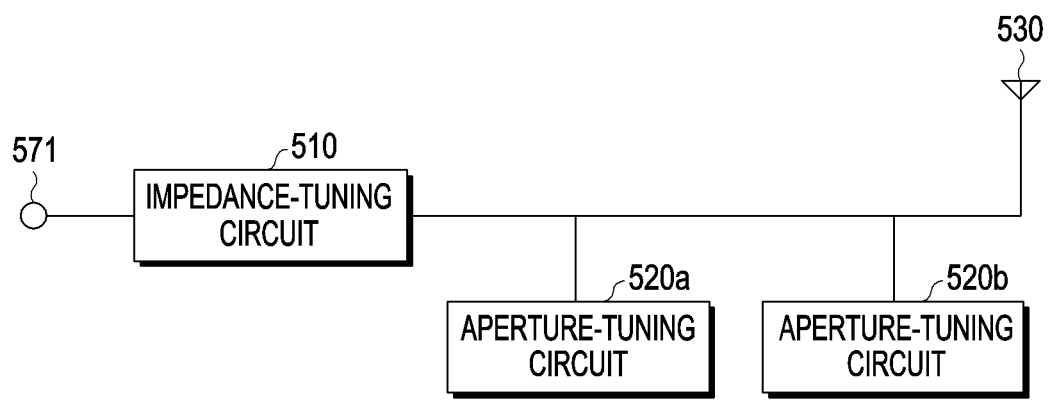
FIG. 5D is a block diagram illustrating an example antenna-tuning circuit according to various embodiments.

FIG. 5A is a block diagram illustrating an example antenna-tuning circuit according to various embodiments, FIG. 5B is a circuit diagram illustrating an example antenna-tuning circuit according to various embodiments, FIG. 5C is a circuit diagram illustrating an example antenna-tuning circuit according to various embodiments, and FIG. 5D is a block diagram illustrating an example antenna-tuning circuit according to various embodiments.

Referring to FIG. 5A, the first antenna-tuning circuit 410 according to various embodiments may include at least one impedance-tuning circuit 510 and at least one aperture-tuning circuit 520. The second antenna-tuning circuit 420 may be implemented to be identical or similar to the first antenna-tuning circuit 410, or may be implemented to be different from the first antenna-tuning circuit 410. The impedance-tuning circuit 510 according to various embodiments may be configured to perform impedance matching with a network under the control of at least one processor (e.g., the processor 120, the communication processor 212 and 214, and/or the integrated communication processor 260). The aperture-tuning circuit 520 according to various embodiments may change the structure of an antenna by turning on/off a switch according to control performed by at least one processor.

FIG. 5B is a circuit diagram illustrating the impedance-tuning circuit 510. FIG. 5C is a circuit diagram illustrating the aperture-tuning circuit 520.

Referring to FIG. 5B, the impedance-tuning circuit 510 according to various embodiments may include at least one variable capacitor 541, at least one first switch 542, at least one second switch 543, at least one third switch 544, and at least one fourth switch 545. According to various embodiments, the number of the at least one variable capacitor 541, the at least one first switch 542, the at least one second switch 543, the at least one third switch 544, and the at least one fourth switch 545 may be changed. According to various embodiments, the at least one variable capacitor 541, the at least one first switch 542, the at least one second switch 543, the at least one third switch 544, and the at least one fourth switch 545 may be implemented on a single chip. The variable capacitor 541 according to various embodiments may have, for example, 16 values (e.g., capacitance values). According to various embodiments, the number of capacitance values of the variable capacitor 541 may be changed. In this instance, the impedance-tuning circuit 510 according to various embodiments may have a total of 256 values (e.g., impedance values) that may be set, wherein 256 is obtained by multiplying 16 (the number of values that the variable capacitance may have) by 16 (the number of cases of the combination of 4 switches). The variable capacitor 541 according to various embodiments may be electrically connected to the first switch 542. One end of each of the second switch 543, the third switch 544, and the fourth switch 545 according to various embodiments may be grounded.

Referring to FIG. 5C, the aperture-tuning circuit 520 according to various embodiments may include a fifth switch 522, a sixth switch 524, a seventh switch 526, and an eighth switch 528. According to various embodiments, the fifth switch 522 may be connected to a first terminal (RF1) 522*a*. According to various embodiments, the sixth switch 524 may be connected to a second terminal (RF2) 524*a*. According to various embodiments, the seventh switch 526 may be connected to a third terminal (RF3) 526*a*. According to various embodiments, the eighth switch 528 may be connected to a fourth terminal (RF4) 528*a*. According to various embodiments, the number of switches included in the aperture-tuning circuit 520 may be changed. According to various embodiments, the fifth switch 522, the sixth switch 524, the seventh switch 526, and the eighth switch 528 may be implemented on a single chip. According to various embodiments, there may be a total of 16 cases, which is the number of on/off combinations of switches (e.g., the fifth switch 522, the sixth switch 524, the seventh switch 526, and the eighth switch 528) that the aperture-tuning circuit 520 may have. Therefore, the aperture-tuning circuit 520 according to various embodiments may have a total of 4096 (that is, 256×16) antenna configurations.

The antenna configurations according to various embodiments may be stored in a memory (the memory 130 of FIG. 1 or a memory included in, or connected to, the communication processor 212, 214, and 260) in advance (e.g., during the process of manufacturing the electronic device 101) in the form of a mapping table. The mapping table according to various embodiments may include information associated with a bandwidth, the 4096 antenna configurations as mentioned herein, and voltage standing-wave ratio (VSWR) values corresponding to the respective antenna configurations and bandwidth information. The information associated with a bandwidth included in the mapping table according to various embodiments may include information associated with all bandwidths providable by a network operator. The electronic device 101 may identify an antenna configuration that maximizes an antenna efficiency (e.g., VSWR) in the current bandwidth, and may control an aperture-tuning circuit and/or an impedance-tuning circuit based on the identified antenna configuration. The mapping table stored in the memory according to various embodiments may be updated via wireless transmission communication or wired communication in response to a selection by a user or an update event that occurs without a selection by a user.

According to various embodiments, as illustrated in FIG. 5D, the impedance-tuning circuit 510 may be connected to a conduction point 571. The conduction point 571 may be connected to, for example, an RFFE, and may be connected to a duplexer (not illustrated) of the RFFE. The conduction point 571 may be a power rail (or power lane) to which an RFFE and an antenna-tuning circuit are connected. The impedance-tuning circuit 510 may be connected to an antenna 530, and the aperture-tuning circuit 520*a* and 520*b* may be connected to the power rails that connect the impedance-tuning circuit 510 and the antenna 530.

Figure 6:
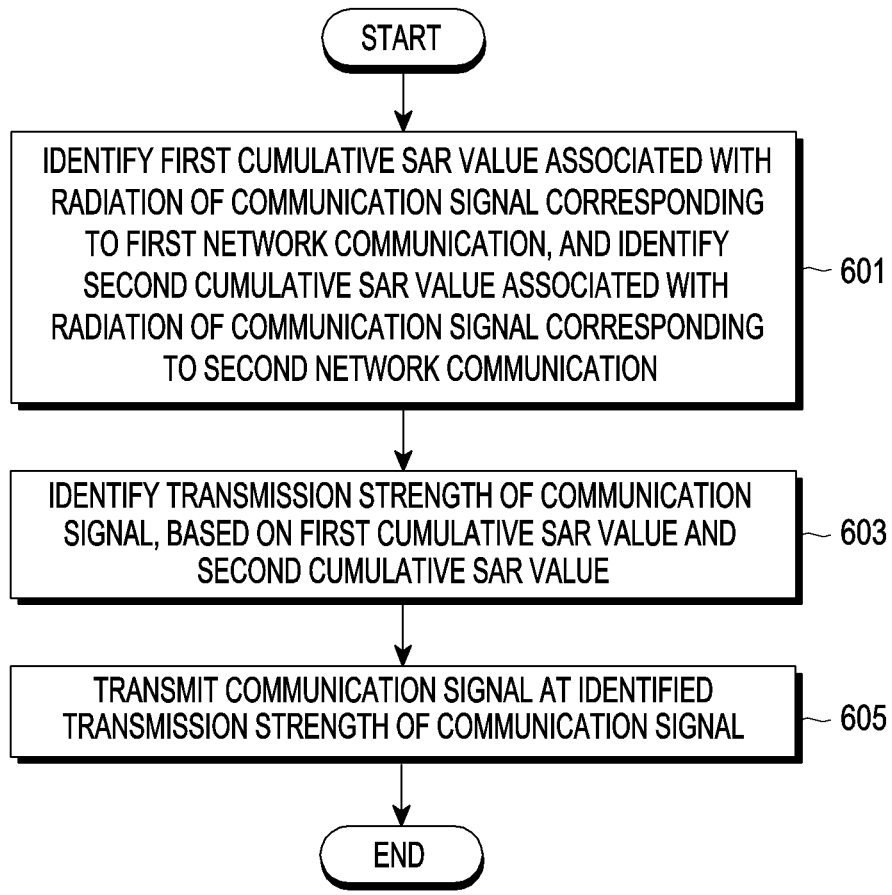
FIG. 6 is a flowchart illustrating an example operation of an electronic device according to various embodiments.

FIG. 6 is a flowchart illustrating an example operation of an electronic device according to various embodiments.

According to various embodiments, the electronic device 101 (e.g., at least one of the processor 120, the first communication processor 212, the second communication processor 214, or the integrated communication processor 260) may identify a first cumulative SAR value associated with emission (radiation) of a communication signal corresponding to first network communication and a second cumulative SAR value associated with emission (radiation) of a communication signal corresponding to second network communication in operation 601. The electronic device 101 may store information associated with power input to an antenna for emission of a communication signal corresponding to the first network communication, which was transmitted in the past, and may store information associated with power input to an antenna for emission of a communication signal corresponding to the second network communication, which was transmitted in the past. The information associated with power that is input to an antenna may be expressed in, for example, dB or dBm, or may be expressed in W (Watts), but the unit used for expressing the information is not limited thereto. According to various embodiments, the electronic device 101 may store information associated with power radiated from an antenna, and may use any information associated with the magnitude of power that is associated with an SAR, without restriction. The magnitude of power input to an antenna and/or the magnitude of power radiated from an antenna may be referred to as the transmission strength of a communication signal. The electronic device 101 may store pieces of information associated with a transmission strength corresponding to each network communication signal during a designated period of time. The electronic device 101 may identify the first cumulative SAR value corresponding to the first network communication based on the information associated with the transmission strength of a communication signal corresponding to the first network communication, and may identify the second cumulative SAR value corresponding to the second network communication based on the information associated with the transmission strength of a communication signal corresponding to the second network communication.

According to various embodiments, the electronic device 101 may identify a cumulative SAR value based on an antenna configuration (e.g., the setting of an impedance-tuning circuit and/or the setting of an aperture-tuning circuit) applied at a point in time in the past. The actual radiation power may be different depending on an antenna configuration, which will be described in greater detail below. The electronic device 101 may identify a cumulative SAR value by taking into consideration an antenna configuration, and may identify a value that is closer to an actual cumulative SAR value. For example, the electronic device 101 may identify respective SAR values at a plurality of sub-intervals in a designated period of time, and may identify a cumulative SAR value by summing the SAR values at the plurality of sub-intervals. According to another embodiment, the electronic device 101 may manage a cumulative SAR value in a manner that stores only a cumulative SAR value during a designated period of time at a point in time in the past, and updates the same. In this instance, the electronic device 101 may not store information associated with a transmission strength at the point in time in the past.

According to various embodiments, the electronic device 101 may determine (identify) the transmission strength of a communication signal for which transmission is scheduled at the present point in time based on the first cumulative SAR value and the second cumulative SAR value in operation 603.

In operation 605, the electronic device 101 may transmit a communication at the determined (identified) transmission strength of the communication signal. For example, based on a cumulative SAR value, the electronic device 101 may estimate a cumulative SAR value during a designated period of time (e.g., 50 seconds) at at least one point in time in the future. For example, the electronic device 101 may estimate a cumulative SAR value during 50 seconds, which is the designated period of time, at a first point in time in the future, which is 0.5 seconds later, and may estimate a cumulative SAR value during 50 seconds at each of a second point in time to a fiftieth point in time in the future, which correspond to 1.0 seconds to 49.5 seconds later. In order to estimate a cumulative SAR value during a designated period of time at a point in time in the future, the electronic device 101 may use at least a part of a cumulative SAR value at a point in time in the past. According to various embodiments, if an estimated cumulative SAR value at at least one point in time in the future exceeds a threshold cumulative value, the electronic device 101 may determine the transmission strength of a communication signal to be transmitted at the present point in time to be a backoff transmission strength. If an estimated cumulative SAR value at at least one point in time in the future is less than or equal to the threshold cumulative value, the electronic device 101 may determine the transmission strength of a communication signal to be transmitted at the present point in time to be a normal transmission strength. According to various embodiments, the expression that reads "transmission of a communication signal at a determined transmission strength" may refer, for example, to the electronic device 101 setting a parameter (e.g., the bias of a power amplifier (power amp bias) or RF gain) based on the determined transmission strength. For example, at least one of the first communication processor 212, the second communication processor 214, or the integrated communication processor 260 may set (or adjust) the parameter (setting) of at least one of the first RFIC 222, the second RFIC 224, the third RFIC 226, the fourth RFIC 238, the first RFFE 232, or the second RFFE 234. Those skilled in the field will understand that any parameter that is used to control the magnitude of power (or current) applied to an antenna may be used without restriction.

According to various embodiments, if an estimated cumulative SAR value at at least one point in time in the future exceeds a threshold cumulative value, the electronic device 101 may determine the transmission strength of a communication signal to be transmitted at the present point in time to be a backoff transmission strength. If an estimated cumulative SAR value at at least one point in time in the future is less than or equal to the threshold cumulative value, the electronic device 101 may determine the transmission strength of a communication signal to be transmitted at the present point in time to be a normal transmission strength. As described above, a cumulative SAR value at a point in time in the future may remain less than or equal to the threshold cumulative value, and thus an average SAR value may be maintained to be less than or equal to a threshold average value.

Depending on the case, if an SAR event is raised, the electronic device 101 may determine a threshold strength corresponding to the SAR event, which is different from a normal transmission strength, although an estimated cumulative SAR value at at least one point in time in the future is less than or equal to the threshold cumulative value. The SAR event may be an event that may change an SAR that affects a user, such as user approach, and a transmission strength may be set differently for each event. As described above, if an estimated cumulative SAR value at a point in time in the future is less than or equal to the threshold cumulative value, the electronic device 101 may determine the smallest value between the normal transmission strength and the transmission strength corresponding to the SAR event when the SAR event is raised. Furthermore, if an estimated cumulative SAR value at a point in time in the future exceeds the threshold cumulative value, the electronic device 101 may identify the smallest value among the normal transmission strength, a transmission strength corresponding to an SAR event when the SAR event is raised, and a backoff strength based on the cumulative value.

FIG. 6 illustrates an example operation that determines the transmission strength of a communication signal based on cumulative SAR values associated with two network communications. However, this is merely an example, and those skilled in the art will understand that a transmission strength may be determined based on a cumulative SAR value associated with one type of network communication, and a transmission strength may be determined based on cumulative SAR values associated with three or more network communications.

Figure 7:
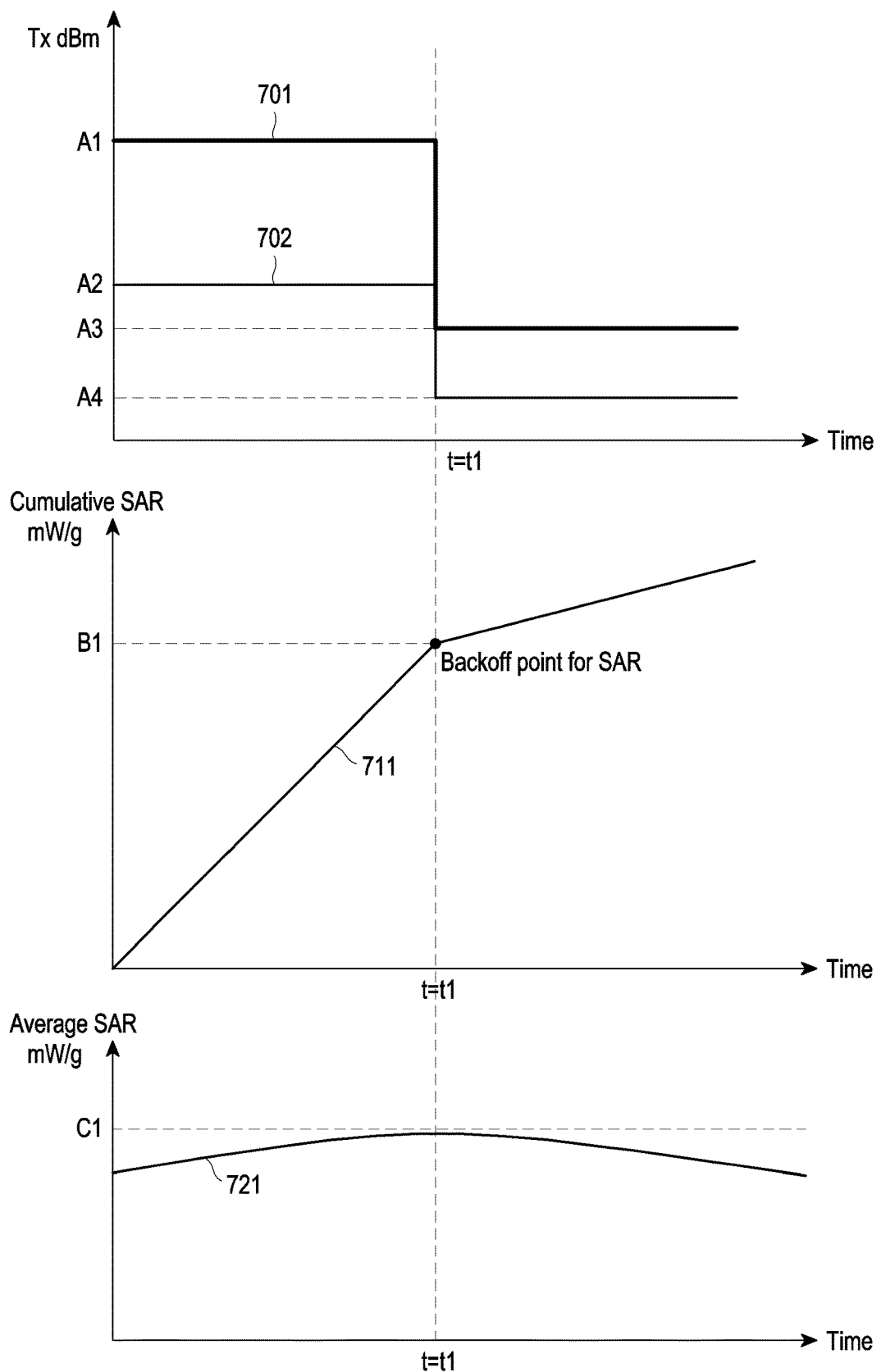
FIG. 7 is a diagram including graphs illustrating an example backoff process performed based on a cumulative SAR value according to various embodiments.

FIG. 7 is a diagram including graphs illustrating an example backoff process performed based on a cumulative SAR value according to various embodiments.

According to various embodiments, the electronic device 101 (e.g., at least one of the processor 120, the first communication processor 212, the second communication processor 214, or the integrated communication processor 260) may set a transmission strength 701 of first communication (e.g., LTE communication) to A1, and may set a transmission strength 702 of second communication (e.g., NR communication) to A2 during a first time interval (t<t1). A1 and A2 may be, for example, transmission strengths that are not backed off. If an SAR event is raised, A1 and A2 may be backoff transmission strengths corresponding to the SAR event. During the first time interval (t<t1), a cumulative SAR 711 may be increased to B 1, and an average SAR 721 may also be increased. For example, if current transmission strengths 701 and 702 are maintained at t1, the electronic device 101 may identify that the average SAR 721 at a point in time in the future may exceed a threshold average value C 1. Methods of determining whether an estimated average SAR exceeds a threshold average value will be described later. The electronic device 101 may be configured to determine whether an estimated cumulative SAR during a designated period of time at a point in time in the future exceeds a threshold cumulative value.

According to various embodiments, if the average SAR 721 is estimated to exceed a threshold average value, the electronic device 101 may back off the transmission strength 701 of the first network to A3, and may back off the transmission strength 702 of the second network to A4 during a second time interval (t≥t1). It is identified that the rate of increase of the cumulative SAR 711 during the second time interval (t≥t1) is decreased more than the rate of increase of the cumulative SAR 711 during the first time interval (t<t1) since back off was performed. In addition, it is identified that the average SAR 721 is decreased during the second time interval (t≥t1) since back off was performed. Although not illustrated, although the electronic device 101 again increases the strength that has been backed off, the average SAR at a point in time in the future may remain less than or equal to the threshold average value. In this instance, the electronic device 101 may again increase the transmission strengths A3 and A4 to A1 and A2. As described above, the average SAR 721 may be maintained less than or equal to the threshold average value C.

Figure 8:
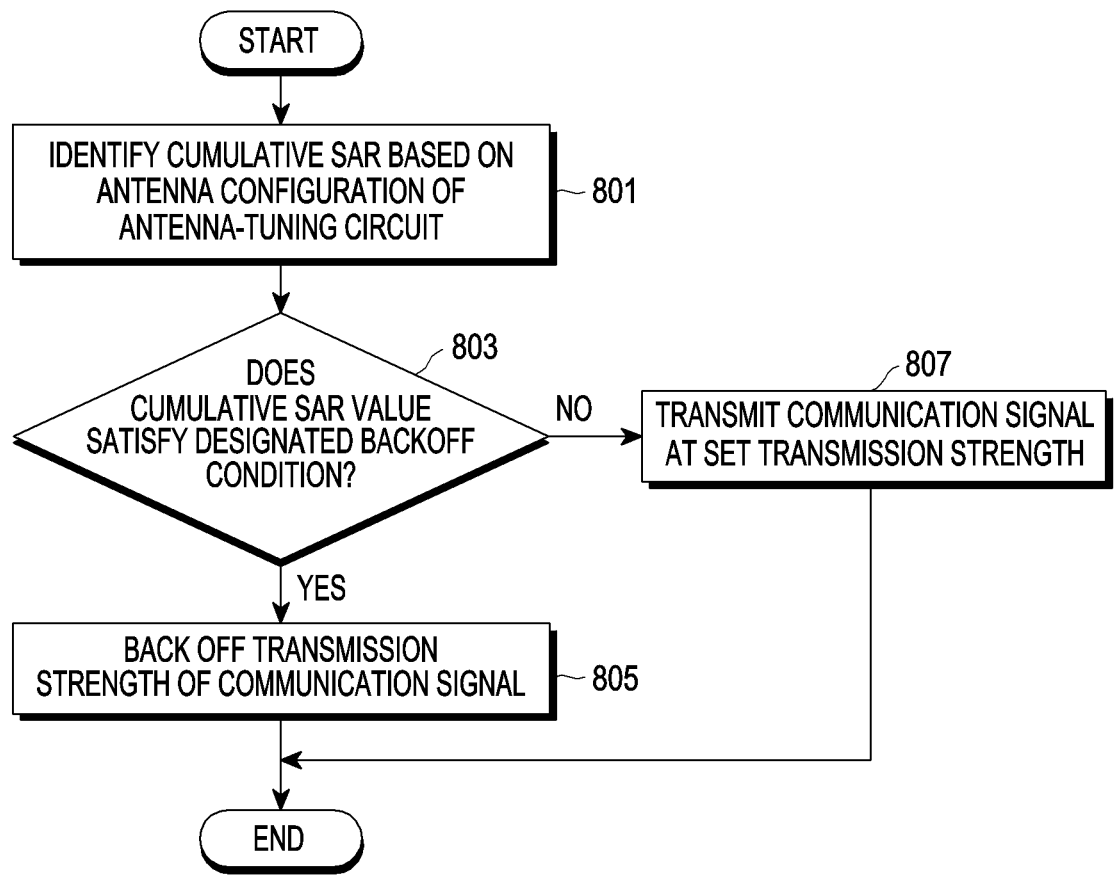
FIG. 8 is a flowchart illustrating an example operation of an electronic device according to various embodiments.
Figure 9:
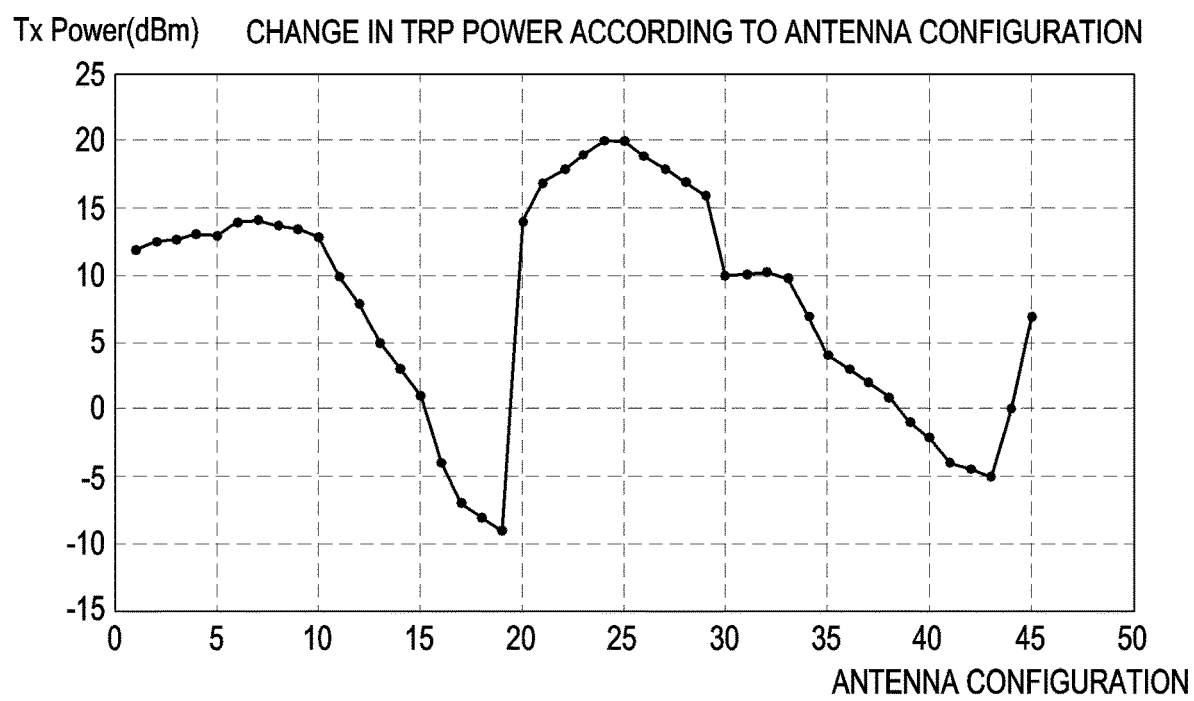
FIG. 9 is a diagram including a graph illustrating an example of total radiated power (TRP) for each antenna configuration according to various embodiments.

Although FIG. 7 illustrates a configuration that backs off the transmission strength 701 of the first network communication and the transmission strength 702 of the second network communication at substantially the same time, this is merely an example. The electronic device 101 according to various embodiments may preferentially back off the transmission strength of any one of network communication. In addition, although FIG. 7 illustrates that an antenna configuration is maintained without change during the first time interval (t<t1), the antenna configuration may be changed during the first time interval (t<t1). The electronic device 101 according to various embodiments may determine whether to perform backoff by calculating a cumulative SAR (or an average SAR) based on the changed antenna configuration. FIG. 8 is a flowchart illustrating an example operation method of an electronic device according to various embodiments. The example of FIG. 8 will be described with reference to FIG. 9. FIG. 9 is a diagram including a graph illustrating example total radiated power (TRP) for each antenna configuration according to various embodiments.

According to various embodiments, the electronic device 101 (e.g., at least one of the processor 120, the first communication processor 212, the second communication processor 214, or the integrated communication processor 260) may identify a cumulative SAR value based on the antenna configuration of an antenna-tuning circuit (e.g., the first antenna-tuning circuit 410 and/or the second antenna-tuning circuit 420) in operation 801. Referring to FIG. 9, a TRP may be different for each antenna configuration. An SAR associated with the emission of a communication signal may be dependent upon a TRP. Referring to FIG. 9, the magnitude (dBm) of transmission power may be measured to be different for each of the indices (0 to 50) indicating antenna configurations. For example, as a TRP increases, an SAR, which is the rate of absorption expected to affect a user, may also increase. If an antenna configuration is changed, a TRP is also changed, as illustrated in FIG. 9, and this may cause a change in an SAR. The electronic device 101 may identify an SAR raised at a point in time in the past based on an antenna configuration used at the point in time in the past, and may identify a cumulative SAR value (or an average SAR value) based on the identified SAR. For example, the electronic device 101 may calculate an SAR value using a TRP value determined based on an antenna configuration, or may identify an SAR value mapped to an antenna configuration.

According to various embodiments, in operation 803, the electronic device 101 may identify whether a cumulative SAR value satisfies a designated backoff condition. For example, the electronic device 101 may determine whether the sum of a cumulative SAR value during a designated period of time at a point in time in the past, an SAR at the present point time, and an estimated SAR value at a point in time in the future exceeds a threshold cumulative value. If the sum exceeds the threshold cumulative value, the electronic device 101 may identify that backoff is required. If the sum is less than or equal to the threshold cumulative value, the electronic device 101 may identify that backoff is not required. If the designated backoff condition is satisfied in operation 803 (Yes), the electronic device 101 may back off the transmission strength of a communication signal in operation 805. If the designated backoff condition is not satisfied in operation 803 (No), the electronic device 101 may transmit a communication signal at a set transmission strength in operation 807. The set transmission strength may be determined by a network to be, for example, a target transmission strength. However, the method of setting a transmission strength is not limited. The set transmission strength may be a transmission strength that is not backed off.

According to various embodiments, the electronic device 101 may determine whether to perform backoff in consideration of a power density in addition to an SAR. For example, if the sum of the ratio of a cumulative SAR to a threshold SAR value and the ratio of a cumulative PD to a threshold PD value is estimated to exceed 1, the electronic device 101 may determine to back off a transmission strength. The configuration of a threshold PD value or a cumulative PD may be substantially the same as the corresponding configuration of an SAR.

FIG. 10A is a table illustrating example antenna efficiency and an SAR according to various embodiments.

The electronic device 101 according to various embodiments (at least one of the processor 120, the first communication processor 212, the second communication processor 214, or the integrated communication processor 260) may store an antenna efficiency (radiation power/conduction power) for each band with respect to the combination of an aperture tuner set value and an impedance tuner set value. Conduction power may be, for example, the strength of power input from the conduction point 571 to the impedance-tuning circuit 510, as illustrated in FIG. 5D. Radiation power may be, for example, the strength of power radiated from the antenna 530 of FIG. 5D. An antenna efficiency may be referred to as, for example, an emission efficiency or a radiation efficiency. Although FIG. 10A illustrates an antenna efficiency of each antenna configuration for each of band 1 and band 3, this is merely an example. The electronic device 101 may store an antenna efficiency of each antenna configuration, in advance, for each of the bands supported for a CA (carrier aggregation) combination and for a DC combination.

A calculated SAR in FIG. 10A may be the maximum SAR (MAX SAR) at a target transmission strength (e.g., 23.5 dBm) used in a comparative example and in an embodiment of the disclosure. In the comparative example, the electronic device may not calculate or manage SARs for respective antenna configurations, but may manage the maximum SAR measured in association with a predetermined conduction power. Accordingly, even though an SAR that is actually raised according to an antenna configuration is smaller than the maximum SAR, the electronic device of the comparative example uses the maximum SAR at the corresponding conduction power, and thus backoff of a transmission strength may be caused earlier. However, the calculated SAR may be set to a value that is obtained by multiplying the maximum SAR by a value that is obtained by dividing the target transmission strength by the maximum transmission strength. Accordingly, the target transmission strength may be maintained at the identical value for all antenna configurations. The electronic device 101 may store the maximum SAR. The electronic device 100 according to the comparative example may use the maximum SAR (or a value obtained by adjusting the maximum SAR based on the target transmission strength) when calculating a cumulative SAR. Accordingly, the electronic device 101 may determine that an SAR greater than an SAR actually raised by the electronic device 101 is raised, and thus there is a possibility that the transmission strength of a communication signal is backed off earlier.

The electronic device 101 according to various embodiments may identify a cumulative SAR (or an average SAR) based on an actual SAR. The electronic device 101 may identify an actually occurring SAR corresponding to the target transmission strength (e.g., 23.5 dBm), as illustrated in FIG. 10A. The electronic device 101 may calculate an actual SAR, or may identify an actual SAR that is stored. Various embodiments associated with identifying an actual SAR will be described later.

According to various embodiments, the electronic device 101 may determine the antenna configuration having the highest antenna efficiency when using a predetermined band. For example, if band 1 is used, the electronic device 101 may identify that a first antenna efficiency 1001 (e.g., 0.9) of the antenna configuration, including an aperture-tuning circuit set value of "1" and an impedance-tuning circuit set value of "a", is the maximum value. The electronic device 101 may control an antenna-tuning circuit so as to have the first antenna configuration (e.g., the aperture-tuning circuit set value of "1" and the impedance-tuning circuit set value of "a") corresponding to the first antenna efficiency 1001. The electronic device 101 may identify a first actual SAR 1003 (e.g., 1.20 mW/g) corresponding to the first antenna configuration. In a subsequent process of identifying a cumulative SAR value, if the first antenna configuration is used, the electronic device 101 may use the first actual SAR 1003, as opposed to a calculated SAR corresponding to the first antenna configuration.

According to various embodiments, in CA based on band 1 and band 3, the electronic device 101 may determine an antenna configuration by taking into consideration both the antenna efficiency of band 1 and the antenna efficiency of band 3. At the first antenna configuration, band 1 shows a relatively high antenna efficiency of 0.9, but band 3 shows a relatively low antenna efficiency of 0.4. The electronic device 101 may select a second antenna configuration (e.g., an aperture-tuning circuit set value of "1" and an impedance-tuning circuit set value of "b") based on the amount of current consumed and/or data throughput by taking into consideration both bands. The method of selecting an antenna configuration by taking into consideration a plurality of bands is not limited. The electronic device 101 may identify a second antenna efficiency 1002 (e.g., 0.8) corresponding to the second antenna configuration. The electronic device 101 may control the antenna-tuning circuit so as to have the second antenna configuration (e.g., the aperture-tuning circuit set value of "1" and the impedance-tuning circuit set value of "b") corresponding to the second antenna efficiency 1002. The electronic device 101 may identify a second actual SAR 1004 (e.g., 1.07) based on a calculated SAR corresponding to the second antenna configuration and the second antenna efficiency 1002. As described above, the electronic device 101 may identify the second actual SAR 1004 based on a predetermined calculation scheme, or may identify the second actual SAR 1004 that is stored in advance. In a subsequent process of identifying a cumulative SAR, if the second antenna configuration is used, the electronic device 101 may use the second actual SAR 1004, as opposed to the calculated SAR corresponding to the second antenna configuration. The second actual SAR 1004 of 1.07 mW/g may be smaller than 1.2 mW/g, which is the calculated SAR. A cumulative SAR value when the second SAR 1004 is used may be smaller than a cumulative SAR value when the calculated SAR is used. As described above, the electronic device 101 may back off a transmission strength so that a cumulative SAR value does not exceed a threshold cumulative value, and since the electronic device 101 may use an actual SAR value, the point in time of backing off a transmission strength may be delayed. That is, the electronic device 101 may maintain a high transmission strength for a relatively long period of time. The electronic device 101 may store and/or use a table similar to the table of FIG. 10A even in various dual-connectivity environments (e.g., an EN-DC environment).

According to various embodiments, a calculated SAR in FIG. 10A may be calculated according to Equation 1.

$$SAR_{calc} = SAR_{max} \frac{Power_{cur}}{Power_{max}} \qquad \text{[Equation 1]}$$

$SAR_{max}$ in Equation 1 may be an SAR measured in an environment of maximum transmission strength ($Power_{max}$), and $Power_{cur}$ may be the current transmission strength. According to various embodiments, a calculated SAR in FIG. 10A may be calculated, for example, according to Equation 2.

$$SAR_{calc} = SAR_{max} \frac{Power_{cur}}{Power_{max}} \times \left(\frac{Power_{rod}^{cur}}{Power_{con}^{cur}}\right) \Big/ \left(\frac{Power_{rod}^{max}}{Power_{con}^{max}}\right) \qquad \text{[Equation 2]}$$

In Equation 2, $Power^{cur}_{rad}$ may be the power radiated at the current transmission strength, and $Power^{cur}_{con}$ may be the strength of an input of a conduction point at the current transmission strength.

$$\left(\frac{Power_{rod}^{cur}}{Power_{con}^{cur}}\right)$$

may be an antenna efficiency at the current transmission strength. $Power^{cur}_{max}$ may be power radiated at the maximum transmission strength. $Power^{cur}_{max}$ may be the strength of an input of a conduction point at the maximum transmission strength.

$$\frac{Power_{rod}^{cur}}{Power_{con}^{cur}}$$

may be an antenna efficiency at the maximum transmission strength. Error correction may be additionally performed for the actual SAR calculated according to Equation 2. For example, if 1.17 mW/g is identified according to Equation 2, 1.17+0.117=1.287 mW/g, which is obtained by adding a 10% error estimated value, is identified as an error-corrected actual SAR. If the error-corrected value exceeds the calculated SAR (e.g., 1.2 mW/g) the actual SAR may be set to the calculated value (e.g., 1.2 mW/g). The method of identifying the actual SAR according to Equation 2 is merely an example. The method of calculating the actual SAR is not limited.

According to various embodiments, the electronic device 101 may store an actual SAR for each allocated frequency bandwidth according to an antenna configuration as shown in Table 1.

TABLE 1

| band1 aperture timer set value | impedance timer set value | 3 Mhz | 5 Mhz | 10 Mhz | 15 Mhz | mW/g 20 Mhz |
|---|---|---|---|---|---|---|
| 1 | a | 0.18 | 0.30 | 0.60 | 0.90 | 1.20 |
|   | b | 0.16 | 0.27 | 0.54 | 0.80 | 1.07 |
|   | c | 0.14 | 0.23 | 0.47 | 0.70 | 0.93 |
|   | d | 0.12 | 0.20 | 0.40 | 0.60 | 0.80 |
|   | e | 0.10 | 0.17 | 0.34 | 0.50 | 0.67 |
| 3 | a | 0.08 | 0.13 | 0.27 | 0.40 | 0.53 |
|   | b | 0.06 | 0.10 | 0.20 | 0.30 | 0.40 |
|   | c | 0.04 | 0.07 | 0.14 | 0.20 | 0.27 |
|   | d | 0.02 | 0.03 | 0.07 | 0.10 | 0.13 |
|   | e | 0.00 | 0.00 | 0.00 | 0.00 | 0.00 |
| 3 | a | 0.08 | 0.13 | 0.27 | 0.40 | 0.53 |
|   | b | 0.14 | 0.23 | 0.47 | 0.70 | 0.93 |
|   | c | 0.16 | 0.27 | 0.54 | 0.80 | 1.07 |
|   | d | 0.14 | 0.23 | 0.47 | 0.70 | 0.93 |
|   | e | 0.12 | 0.20 | .040 | 0.60 | 0.80 |

As shown in Table 1, the electronic device 101 may store an actual SAR for each frequency bandwidth according to an antenna configuration (aperture tuner set value and/or impedance tuner set value). The electronic device 101 may store an actual SAR for each modulation scheme according to the antenna configuration of Table 2.

TABLE 2

| band1 20 Mhz | | | | | |
|---|---|---|---|---|---|
| aperture tuner set value | impedance tuner set value | QPSK | 16QAM | 64QAM | mW/g 256QAM |
| 1 | a | 0.96 | 1.02 | 1.08 | 1.20 |
|   | b | 0.86 | 0.91 | 0.96 | 1.07 |
|   | c | 0.74 | 0.79 | 0.84 | 0.93 |
|   | d | 0.64 | 0.68 | 0.72 | 0.80 |
|   | e | 0.54 | 0.57 | 0.60 | 0.67 |
| 2 | a | 0.42 | 0.45 | 0.48 | 0.53 |
|   | b | 0.32 | 0.34 | 0 36 | 0.40 |
|   | c | 0.22 | 0.23 | 0.24 | 0.27 |
|   | d | 0.10 | 0.11 | 0.12 | 0.13 |
|   | e | 0.00 | 0.00 | 0.00 | 0.00 |
| 3 | a | 0.42 | 0.45 | 0.48 | 0.53 |
|   | b | 0.74 | 0.79 | 0.84 | 0.93 |
|   | c | 0.86 | 0.91 | 0.96 | 1.07 |
|   | d | 0.74 | 0.79 | 0.84 | 0.93 |
|   | e | 0.64 | 0 68 | 0.72 | 0.80 |

The electronic device 101 according to various embodiments may identify an actual SAR by making reference to a stored table, such as Table 1 and/or Table 2, based on an antenna configuration, a frequency bandwidth, and/or a modulation scheme.

FIG. 10B is a table illustrating example antenna efficiency and an SAR according to various embodiments.

If a single FDD (frequency division duplex) band is used, the electronic device 101 according to various embodiments may store an antenna efficiency for a band (e.g., band 1), an RX antenna loss for the band (e.g., band 1), and a calculated SAR (a calculated SAR at 23.5 dBm) for each antenna configuration. An actual SAR may be stored in the electronic device 101, or may be identified based on calculation. For example, if the electronic device 101 operates in the B1 band of LTE communication, the electronic device 101 may select a first antenna configuration (e.g., an aperture-tuning circuit set value of "1" and an impedance-tuning circuit set value of "a") corresponding to a first antenna efficiency 1011. In a subsequent process of identifying a cumulative SAR, if the first antenna configuration is used, the electronic device 101 may use a first actual SAR 1013, as opposed to a calculated SAR corresponding to the first antenna configuration. According to various embodiments, if the transmission strength of the current TX is low, that is, approximately 3.5 dBm, and if a communication environment becomes poor, such that an SNR is, for example, 0, the electronic device 101 may change an antenna configuration in order to improve RX performance. For example, the electronic device 101 may select a third antenna configuration (e.g., an aperture-tuning circuit set value of "3" and an impedance-tuning circuit set value of "c") corresponding to a first antenna loss 1012 (e.g., 1 dB). In a subsequent process of identifying a cumulative SAR value, if the third antenna configuration is used, the electronic device 101 may identify a third actual SAR 1014 (e.g., 1.07 mW/g), as opposed to a calculated SAR corresponding to the third antenna configuration. The electronic device 101 may identify that the actual SAR is 0.16 mW/g, which is 1.07 mW/g*(3.5 dBm/23.5 dBm), based on a TX transmission strength of 3.5 dBm.

Figure 11A:
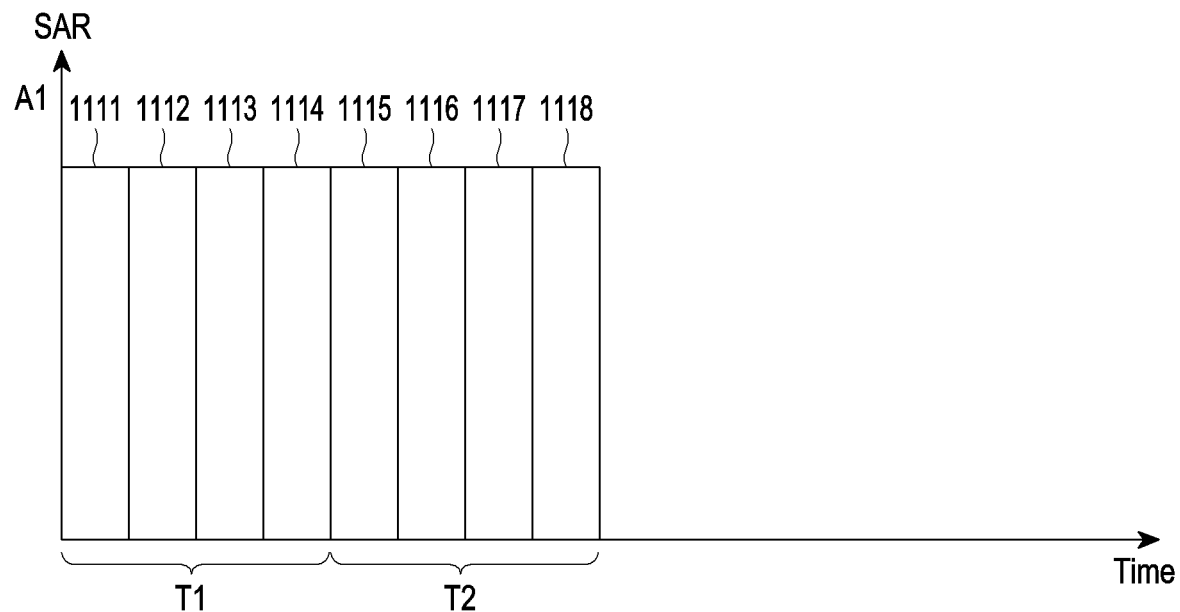
FIG. 11A is a graph illustrating an example SAR set based on the maximum value of a transmission strength and an actual SAR.
Figure 11B:
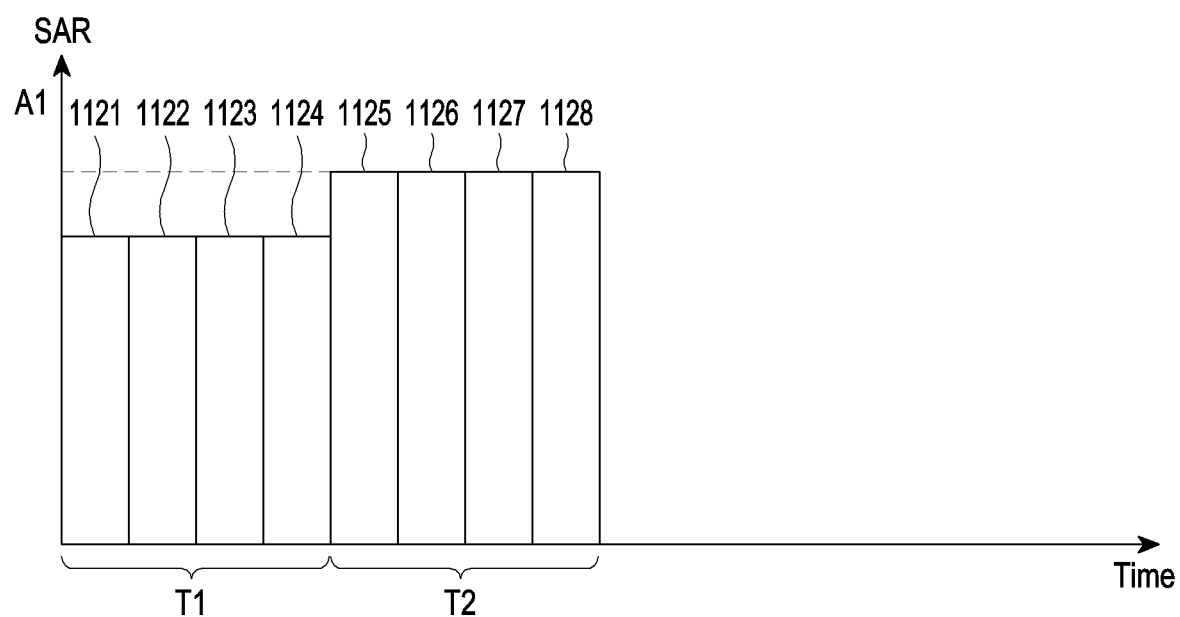
FIG. 11B is a graph illustrating an example SAR set based on the maximum value of a transmission strength and an actual SAR.

FIG. 11A is a graph illustrating an example SAR set based on the maximum value of a transmission strength and an actual SAR, and FIG. 11B is a graph illustrating an example SAR set based on the maximum value of a transmission strength and an actual SAR.

The electronic device 101 according to various embodiments (e.g., at least one of the processor 120, the first communication processor 212, the second communication processor 214, or the integrated communication processor 260) may control an antenna-tuning circuit so as to have a first antenna configuration during a first period of time (T1), and may control the antenna-tuning circuit so as to have a second antenna configuration during a second period of time (T2). As illustrated in FIG. 11A, the electronic device 101 according to a comparative example may identify that an SAR 1111, 1112, 1113, and 1114 having a magnitude of A1 is raised during each sub-interval of the first period of time (T1), and may identify that an SAR 1115, 1116, 1117, and 1118 having a magnitude of A1 is raised during each sub-interval of the second period of time (T2). The electronic device 101 according to the comparative example may use the same SAR (e.g., a calculated SAR in FIG. 10A) for all antenna configurations when calculating a cumulative SAR. Accordingly, the electronic device 101 according to the comparative example may identify that a cumulative SAR of 8*A1 is raised.

The electronic device 101 according to various embodiments may identify A2, which is an actual SAR corresponding to the first antenna configuration, and may identify A1, which is an actual SAR corresponding to the second antenna configuration. The electronic device 101 may identify that SARs 1121, 1122, 1123, and 1124 of A2 are raised during the first period of time (T1), and may identify that SARs 1125, 1126, 1127, and 1128 of A1 are raised during the second period of time (T2). Accordingly, the electronic device 101 according to various embodiments may identify that a cumulative SAR of 4*A1+4*A2 is raised, which may be a smaller value than a cumulative SAR of 8*A1. Accordingly, the electronic device 101 according to various embodiments may secure a longer period of time during which the electronic device 101 can maintain a transmission strength that is not backed off.

Figure 12A:
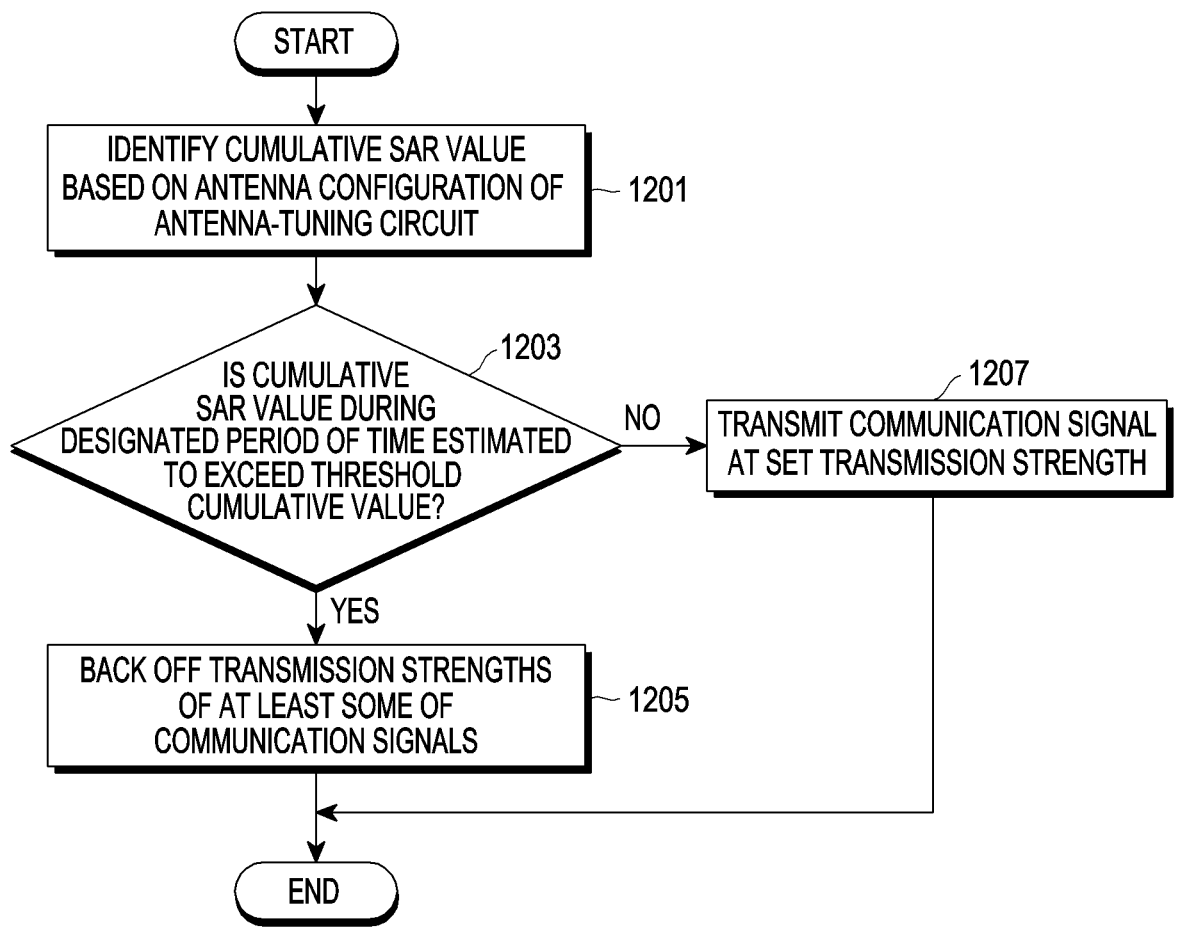
FIG. 12A is a flowchart illustrating an example operation of an electronic device according to various embodiments.

FIG. 12A is a flowchart illustrating an example operation of an electronic device according to various embodiments.

According to various embodiments, the electronic device 101 (e.g., at least one of the processor 120, the first communication processor 212, the second communication processor 214, or the integrated communication processor 260) may identify a cumulative SAR value based on the antenna configuration of an antenna-tuning circuit in operation 1201. As described above, the electronic device 101 may identify a cumulative SAR value based on an actual SAR identified based on an antenna configuration used at a point in time in the past. In operation 1203, the electronic device 101 may identify whether the cumulative SAR value during a designated period of time is estimated to exceed a threshold cumulative value. For example, the electronic device 101 may identify whether the cumulative SAR value during the designated period of time is estimated to exceed the threshold cumulative value based on SARs raised at at least one point in time in the past. The method by which the electronic device 101 identifies whether the cumulative SAR value exceeds the threshold cumulative value is not limited. For example, the electronic device 101 may identify whether the cumulative SAR value exceeds the threshold cumulative value based on a predetermined equation, or may identify whether the cumulative SAR value exceeds the threshold cumulative value by performing calculation associated with each of a plurality of points in time in the future. If it is identified that the cumulative SAR value during the designated period of time exceeds the threshold cumulative value in operation 1203 (Yes), the electronic device 101 may back off any one of the transmission strengths of at least some of communication signals in operation 1205. If it is identified that the cumulative SAR value during the designated period of time does not exceed the threshold cumulative value in operation 1203 (No), the electronic device 101 may transmit a communication signal at a set transmission strength in operation 1207.

Figure 12B:
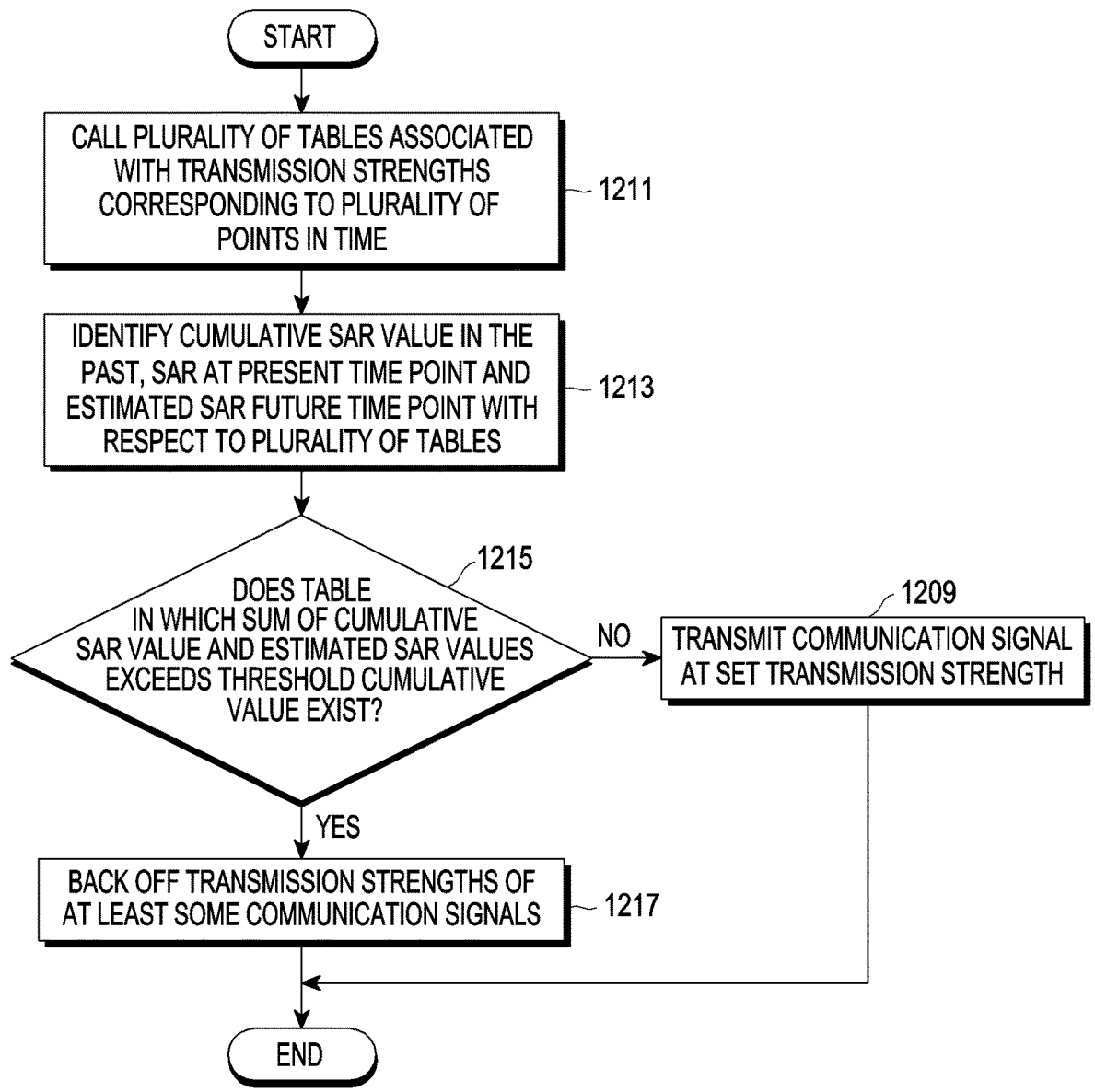
FIG. 12B is a flowchart illustrating an example operation of an electronic device according to various embodiments.
Figure 13A:
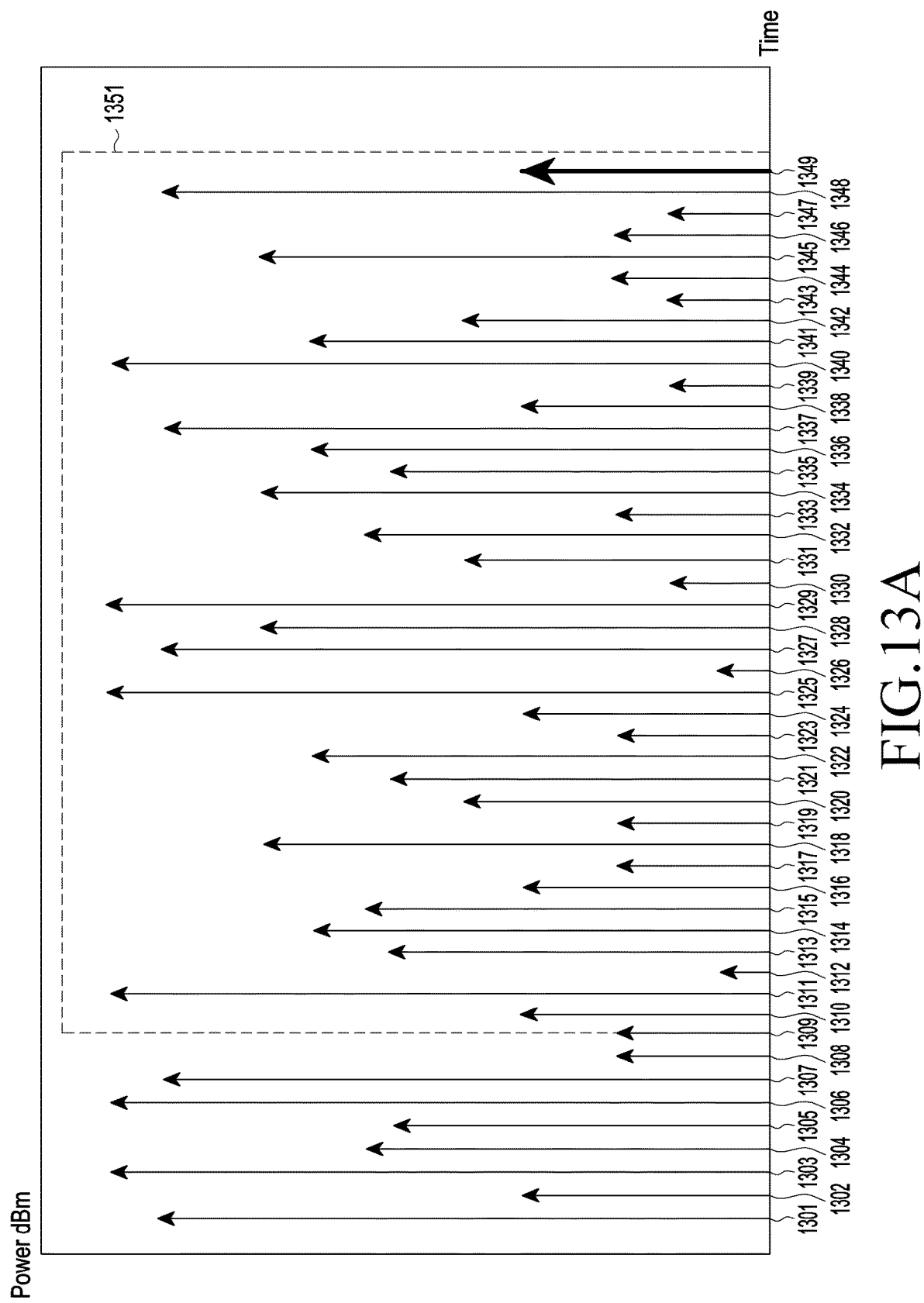
FIG. 13A is a graph illustrating an example transmission strength over time according to various embodiments.
Figure 13B:
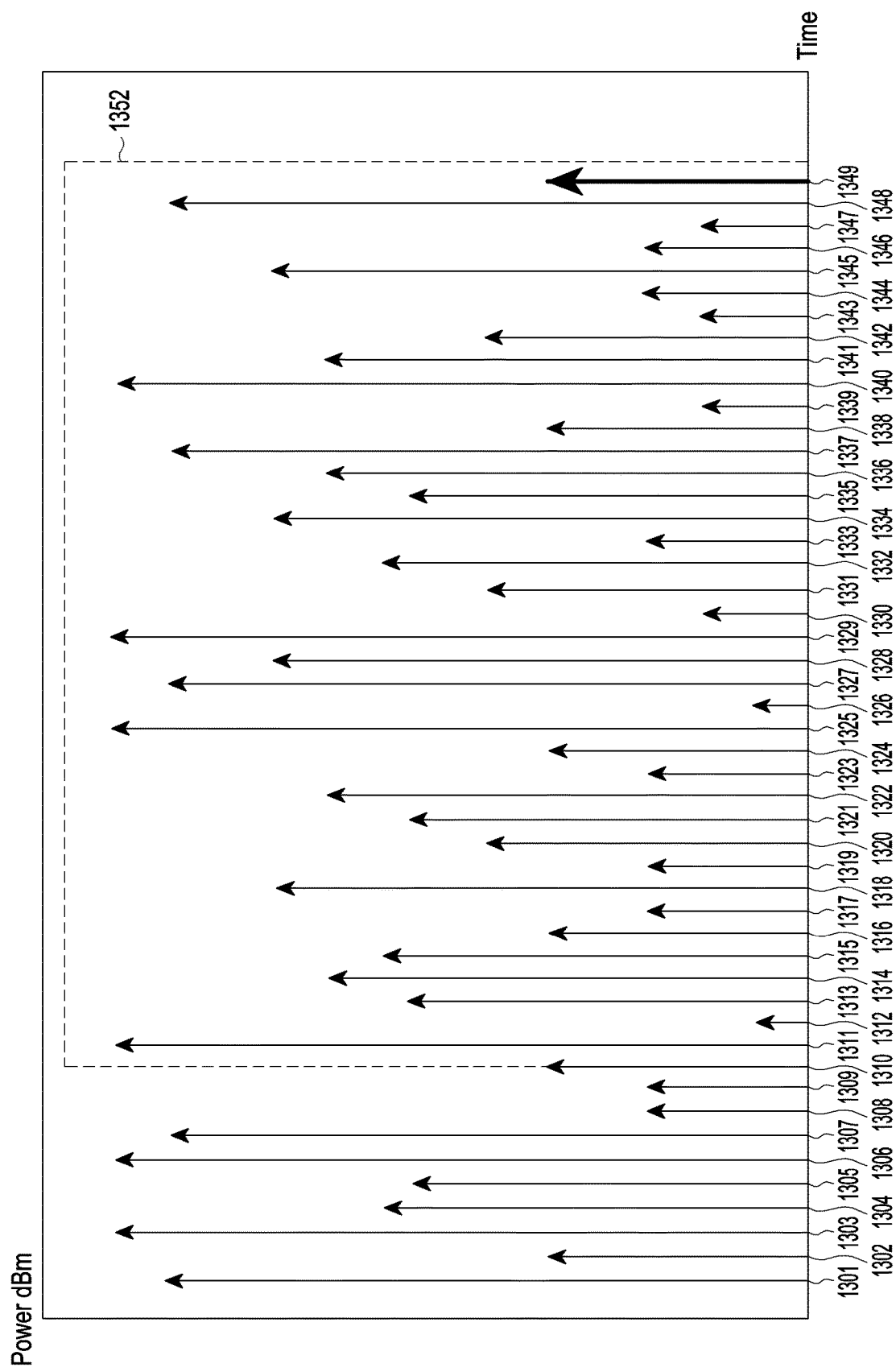
FIG. 13B is a graph illustrating an example transmission strength over time according to various embodiments.
Figure 13C:
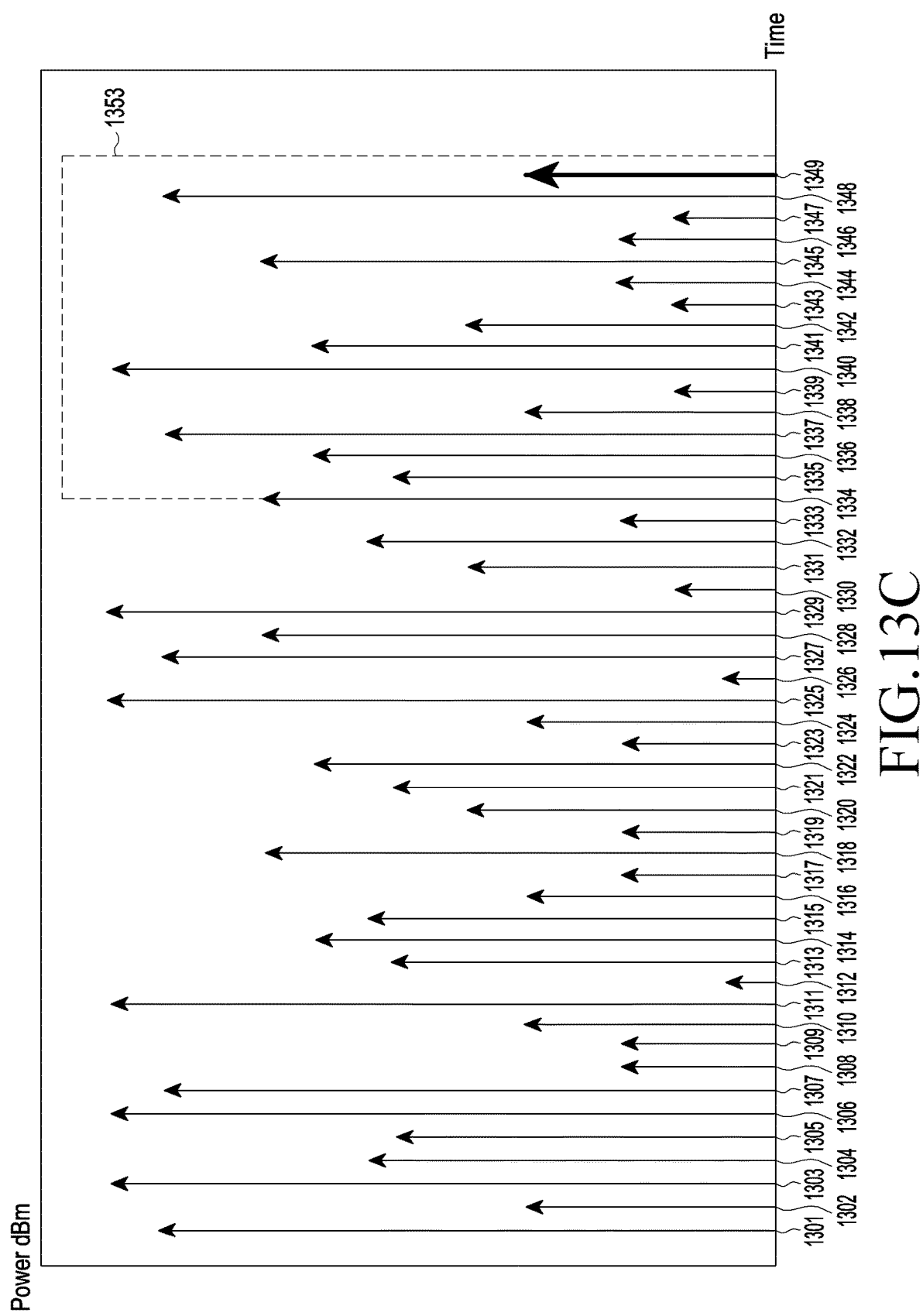
FIG. 13C is a graph illustrating an example transmission strength over time according to various embodiments.
Figure 13D:
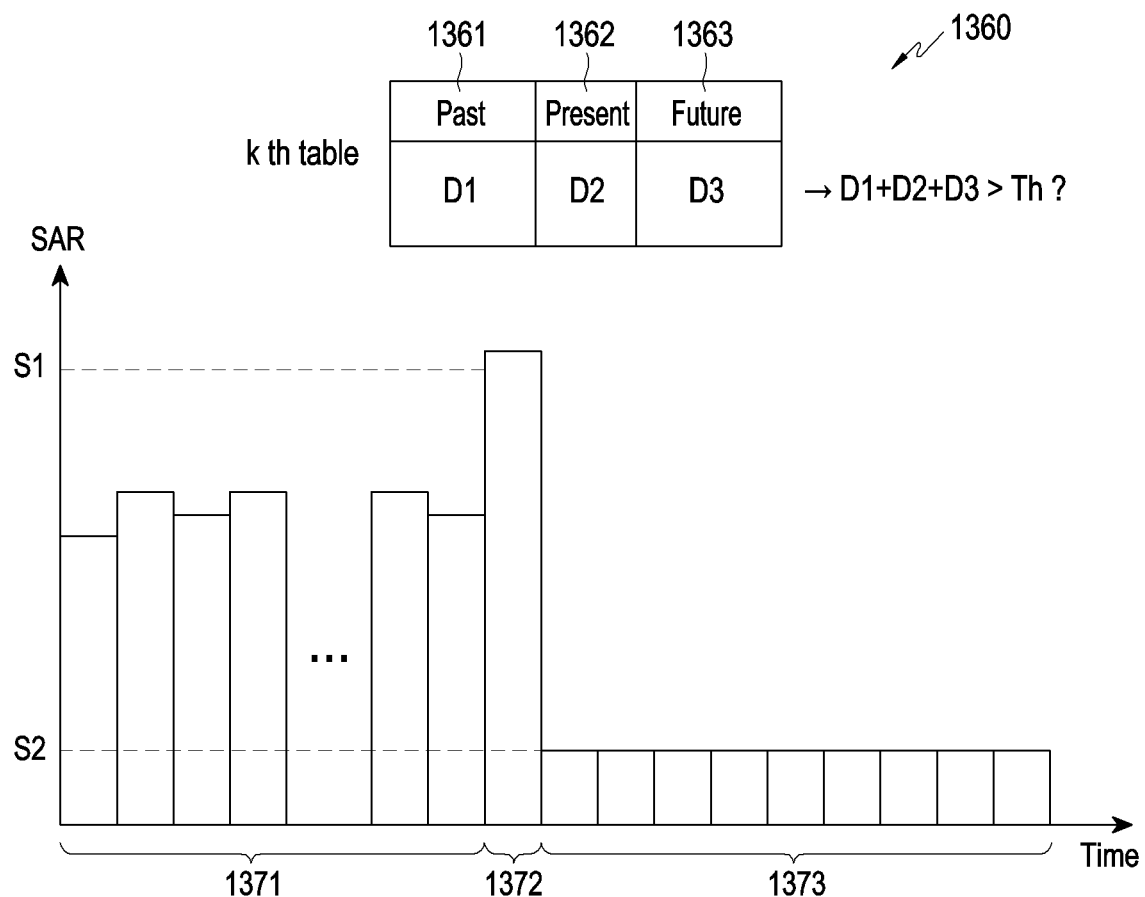
FIG. 13D is a table and graph showing SAR over time according to various embodiments.
Figure 13E:
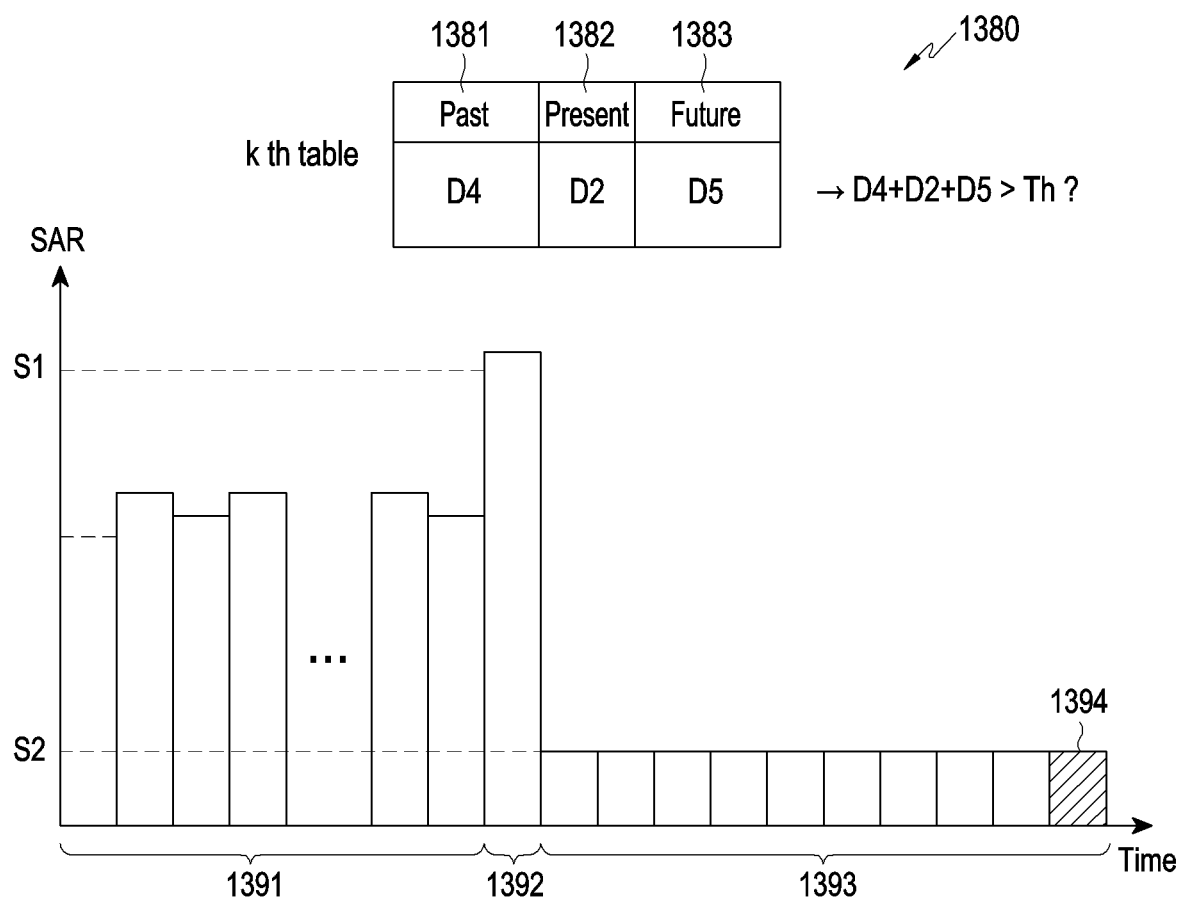
FIG. 13E is a table and graph showing a transmission strength over time according to various embodiments.

FIG. 12B is a flowchart illustrating an example operation of an electronic device according to various embodiments. The example of FIG. 12B will be described with reference to FIGS. 13A, 13B, 13C, 13D and 13E. FIG. 13A is a graph illustrating example transmission strength over time according to various embodiments, FIG. 13B is a graph illustrating example transmission strength over time according to various embodiments, and FIG. 13C is a graph illustrating example transmission strength over time according to various embodiments. FIG. 13D is a table and graph illustrating example SAR over time according to various embodiments, and FIG. 13E is a table and graph illustrating example SAR over time according to various embodiments. Operations that have been described above, among the operations of FIG. 12B, will be briefly described.

According to various embodiments, the electronic device 101 (e.g., at least one of the processor 120, the first communication processor 212, the second communication processor 214, or the integrated communication processor 260) may call a plurality of tables associated with transmission strengths corresponding to a plurality of points in time in operation 1211. Preferentially, a description will be provided with reference to FIGS. 13A, 13B and 13C in order to describe the tables. Referring to FIG. 13A, is a graph including transmission strengths associated with a plurality of time points 1301 to 1349. A cumulative SAR during a designated period of time, for example, during a period of time including 50 points in time, needs to remain less than or equal to a threshold cumulative value. The electronic device 101 may determine the transmission strength of a communication signal to be transmitted at the present point in time 1349, so that the sum of SARs at 9 points in time in the future (not illustrated) in addition to the sum of the SAR at the present point in time 1349 and SARs at some past time points 1309 to 1348 remain less than or equal to the threshold cumulative value. In addition, as illustrated in FIG. 13B, the electronic device 101 may identify transmission strengths 1352 obtained by performing shifting by one time point from the transmission strengths 1351 at the present time point 1349 and the past time points 1309 to 1348 of FIG. 13A. Shifting by one point in time may refer, for example, to the data at the earliest past time point (e.g., the point 1309 of FIG. 13A) not being taken into consideration. The number of transmission strengths 1352 at the present point in time 1349 and the past time points 1310 to 1348 is 40, and may be one smaller than 41, which is the number of transmission strengths 1351 of FIG. 13A. The electronic device 101 may determine the transmission strength at the present time point 1349 so that the sum of SARs at the transmission strengths 1352 and additionally estimated SARs at 10 points in time in the future remain less than or equal to the threshold cumulative value. As illustrated in FIG. 13C, the electronic device 101 may identify transmission strengths 1353 at the present time point 1349 and the past time points 1334 to 1348, obtained by performing shifting by 25 time points from the transmission strengths 1351. The number of transmission strengths 1353 may be 16, and may be 25 smaller than 41, which is the number of transmission strengths 1351 of FIG. 13A. The electronic device 101 may determine the transmission strength at the present time point 1349, so that the sum of SARs at the transmission strengths 1353 and additionally estimated SARs at 34 future time points remain less than or equal to the threshold cumulative value. Although not illustrated, the electronic device 101 may manage a plurality of graphs which have one-shift differences from each other. Hereinafter, with reference to FIGS. 13D and 13E, the configuration of identifying an estimated SAR value will be described.

Referring to FIG. 13D, the electronic device 101 may identify a $k^{th}$ SAR table 1360. The $k^{th}$ SAR table 1360 may include D1, which is a cumulative SAR value 1361 corresponding to at least one point in time in the past, D2, which is the maximum SAR value 1362 at the present point in time, and D3, which is an estimated SAR value 1363 corresponding to at least one point in time in the future. Referring to the graph, the cumulative value of the SAR values corresponding to at least one past time point 1371 may be D1. D1, which is the cumulative SAR value 1361 during at least one point in time in the past, may be identified based on an antenna configuration. The number of the at least one point in time in the past may be one smaller than the total number of time points (e.g., 100) corresponding to the whole period of time (e.g., 50 seconds) in a first table. N, which is the total number of points in time (e.g., 100), may be obtained by dividing the whole period of time by a sampling interval (or a shift interval). Accordingly, in the $k^{th}$ table, the number of the at least one point in time in the past may be k smaller than the total number of points in time. The electronic device 101 may identify D1, which is a cumulative SAR value of N−k past time points 1371. The electronic device 101 may use the maximum value (S1) of an SAR for the present point in time 1372. The maximum value (S1) of the SAR may be an SAR value corresponding to the maximum transmission strength (maximum instantaneous power) designated by the electronic device 101. According to another embodiment, an SAR value at a point in time that is immediately before the present point in time 1372 may be used for the present point in time 1372. According to another embodiment, an average SAR value of SAR values at the past time points 1371 preceding the present time point 1372 may be used for the present time point 1372. The electronic device 101 may calculate the sum of SAR values (S2) at a backoff transmission strength, for at least one future time point 1373. The electronic device 101 may identify D3 as the sum of SARs at at least one future time point 1373. In the $k^{th}$ table, the number of the at least one future point in time may be k−1. Accordingly, the electronic device 101 may identify whether the total sum of SARs (D1+D2+D3) corresponding to N points in time, which include the N−k past time points, one present time point, and k−1 future time points, exceeds a threshold cumulative SAR value (Th), with reference to the $k^{th}$ table. If it is identified that the total sum exceeds the threshold value, the electronic device 101 may back off the transmission strength at the present point in time. Referring to FIG. 13E, the electronic device 101 may identify a $k+1^{th}$ table 1380. The electronic device 101 may identify D4, which is a cumulative SAR value 1381 corresponding to at least one point in time in the past, D2, which is the maximum SAR value 1382 at the present point in time, and D5, which is an estimated SAR value 1383 corresponding to at least one future time point. The electronic device 101 may identify whether a cumulative SAR value of D4+D2+D5 exceeds a threshold cumulative value (Th). In the $k+1^{th}$ table, the number of at least one past time point 1391 may be one smaller than the number of at least one past time point 1371 in the $k^{th}$ table. In the $k+1^{th}$ table, the number of at least one future time point 1393 may be one (the time point 1394) larger than the number of at least one future time point 1373 in the $k^{th}$ table. For example, D5-D3 may be an SAR at the point in time 1373 in the future.

According to various embodiments, in operation 1213, the electronic device 101 may identify a cumulative SAR value in the past, a SAR at the present point in time, and an estimated SAR value at a point in time in the future, with respect to the plurality of tables corresponding to at least one future time point. The electronic device 101 may identify a cumulative SAR value with respect to the first table and a total of N−1 tables obtained by performing shifting by i time points (i being greater than or equal to 1 and less than N−2) from the first table. In operation 1215, the electronic device 101 may identify whether a table in which the sum of the cumulative SAR value and the estimated SAR value exceeds a threshold value exists. If a table that has a sum that exceeds the threshold value is found to exist in operation 1215 (Yes), the electronic device 101 may back off one of transmission strengths of at least some communication signals in operation 1217. If no table that has a sum that exceeds the threshold value is found to exist in operation 1215 (No), the electronic device 101 may transmit a communication signal at a set transmission strength in operation 1219.

Table 3 is an example of a procedure and a parameter for determining whether to perform table-based backoff according to various embodiments.

TABLE 3

| Parameter | i. Measurement Time (T): 50 seconds [description: amount of time spent calculating an average SAR] <br> ii. Measurement Period (P): 0.5 seconds [description: period for calculating an SAR] |
|---|---|

TABLE 3-continued

| | iii. Number of calculator tables: 99 [description: T/P − 1 calculator tables] <br> iv. SAR LIMIT: 80 mW/g [description: maximum SAR value that cannot be passed during T seconds] <br> v. LTE Max power: 23 dBm [description: maximum normal transmission strength value of LTE] (changeable depending on an SAR event) <br> vi. LTE Max Power SAR usage amount of 1 mW/g*sec [description: amount of usage of SARs when maximum normal transmission strength value of LTE is applied] (changeable depending on SAR event) <br> vii. LTE SAR backoff power: 22.5 dBm [description: maximum backoff transmission strength value of LTE] (changeable depending on an SAR event) <br> viii. LTE SAR backoff power SAR usage amount of 0.7 mW/g*sec [description: amount of usage of SARs when maximum backoff transmission strength value of LTE is applied] (changeable depending on SAR event) <br> ix. NR Max power: 23 dBm [description: maximum normal transmission strength value of NR] (changeable depending on SAR event) <br> x. NR Max power SAR usage amount: 1 mW/g*sec [description: amount of usage of SARs when the maximum normal transmission strength value of NR is applied] (changeable depending on an SAR event) <br> xi. NR SAR backoff power: 20 dBm [description: the maximum backoff transmission strength value of NR] (changeable depending on an SAR event) <br> xii. NR SAR backoff power SAR usage amount of 0.1 mW/g*sec [description: amount of usage of SARs when the maximum backoff transmission strength value of NR is applied] (changeable depending on an SAR event) <br> xiii. MAX SAR => maximum SAR value during 0.5 seconds = 1 mW/g ((LTE max + NR max) * time) [description: amount of usage of SARs per unit time when the transmission strengths of LTE/NR are set to maximum values] <br> xiv. MAX Backoff SAR => maximum SAR value when backoff is performed during 1 second = 0.4 mW/g ((LTE backoff max + NR backoff max) * time) [description: amount of usage of SARs per unit time when transmission strengths of LTE/NR are backed off] <br> xv. Current SAR VALUE = cumulative amount of SARs up to the present in each table |
|---|---|
| Criterion | Current SAR VALUE + MAX SAR + (MAX BACKOFF SAR * (remaining time − P)/P > SAR LIMIT |

As described in Table 3, the electronic device 101, for example, may identify whether a criterion is satisfied for each of the 99 calculator tables. "Current SAR value" in the criterion, for example, may be a cumulative SAR value corresponding to the past time points 1371 in FIG. 13D. "MAX SAR" in the criterion, for example, may be the maximum SAR value at the present time point 1372 in FIG. 13D. (remaining time−P)/P in the criterion, for example, may be the number of at least one future time point 1373 in FIG. 13D, and a value obtained by multiplying ((remaining time−P)/P) by SAR(MAX BACKOFF SAR), corresponding to backoff, may be an estimated SAR sum at the point in time in the future 1373. If a table that satisfies the criterion exists among the tables, the electronic device 101 may determine that the transmission strength of a communication signal that is scheduled to be transmitted at the present point in time is a backoff value (e.g., LTE SAR backoff power of 22.5 dBm or NR SAR backoff power of 20 dBm). Although Table 3 describes the case in which both LTE communication and NR communication are backed off at the same time, this is merely an example. As described above, any one communication may be backed off first according to a priority, and this will be described below. SAR LIMIT in Table 3 may be set differently for each table, or may be set to be identical to each other according to another embodiment.

Figure 14:
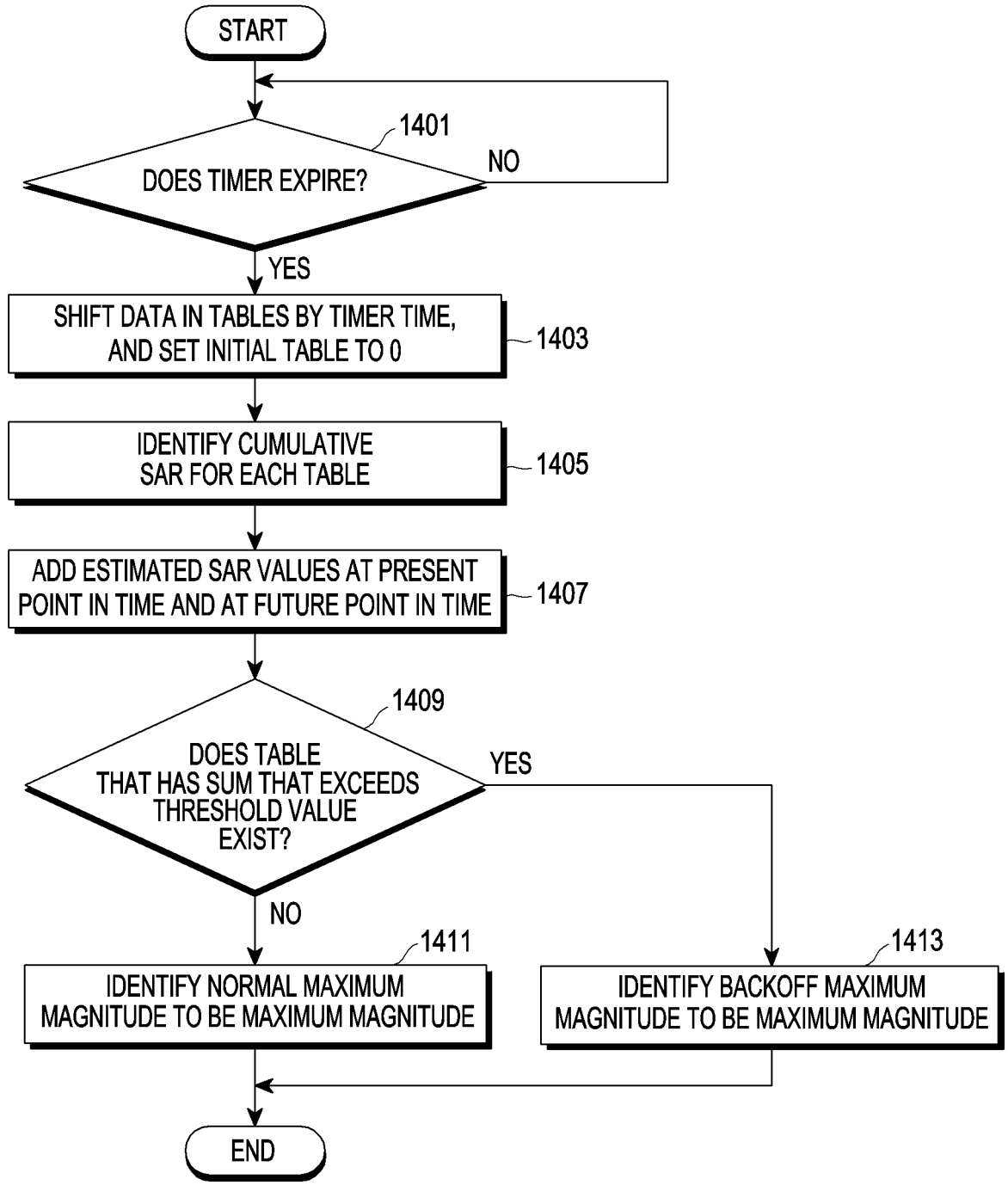
FIG. 14 is a flowchart illustrating an example operation of updating a table and identifying whether a table satisfies a criterion according to various embodiments.

FIG. 14 is a flowchart illustrating an example operation of updating a table and identifying whether a table satisfies a criterion according to various embodiments.

According to various embodiments, the electronic device 101 (e.g., at least one of the processor 120, the first communication processor 212, the second communication processor 214, or the integrated communication processor 260) may identify timer expiry in operation 1401. For example, the timer may be set to 1 unit time (e.g., 0.5 seconds in Table 3). If it is identified that the timer expires in operation 1401 (Yes), the electronic device 101 may shift data in tables by a timer time, and may set the initial table to 0. For example, the electronic device 101 may shift 99 tables of Table 3 by a timer time (e.g., 0.5 seconds), so as to update 98 tables, and may set one table (the initial table) to 0. For example, by shifting, a table of which all points in time belong to the past may be set to 0.

According to various embodiments, the electronic device 101 may identify a cumulative SAR (e.g., current SAR VALUE in Table 1) for each table in operation 1405. In operation 1407, the electronic device 101 may add a SAR value at the present time (e.g., MAX SAR of Table 3) and an estimated SAR value (e.g., MAX Backoff SAR of Table 3), corresponding to a point in time in the future, to the cumulative SAR value for each table. In operation 1409, the electronic device 101 may identify whether a table that has a sum that exceeds the threshold value exists. If no table that has a sum that exceeds the threshold value is found to exist in operation 1409 (No), the electronic device 101 may determine the maximum magnitude to be a normal maximum magnitude in operation 1411. For example, the electronic device 101 may not be restricted by the cumulative SAR value, and may use power required for data transmission based on the previously designated maximum instantaneous power of the electronic device 101. If a table that has the sum that exceeds the threshold value exists in operation 1409 (Yes), the electronic device 101 may determine the maximum magnitude to a backoff maximum magnitude in operation 1413.

Figure 15A:
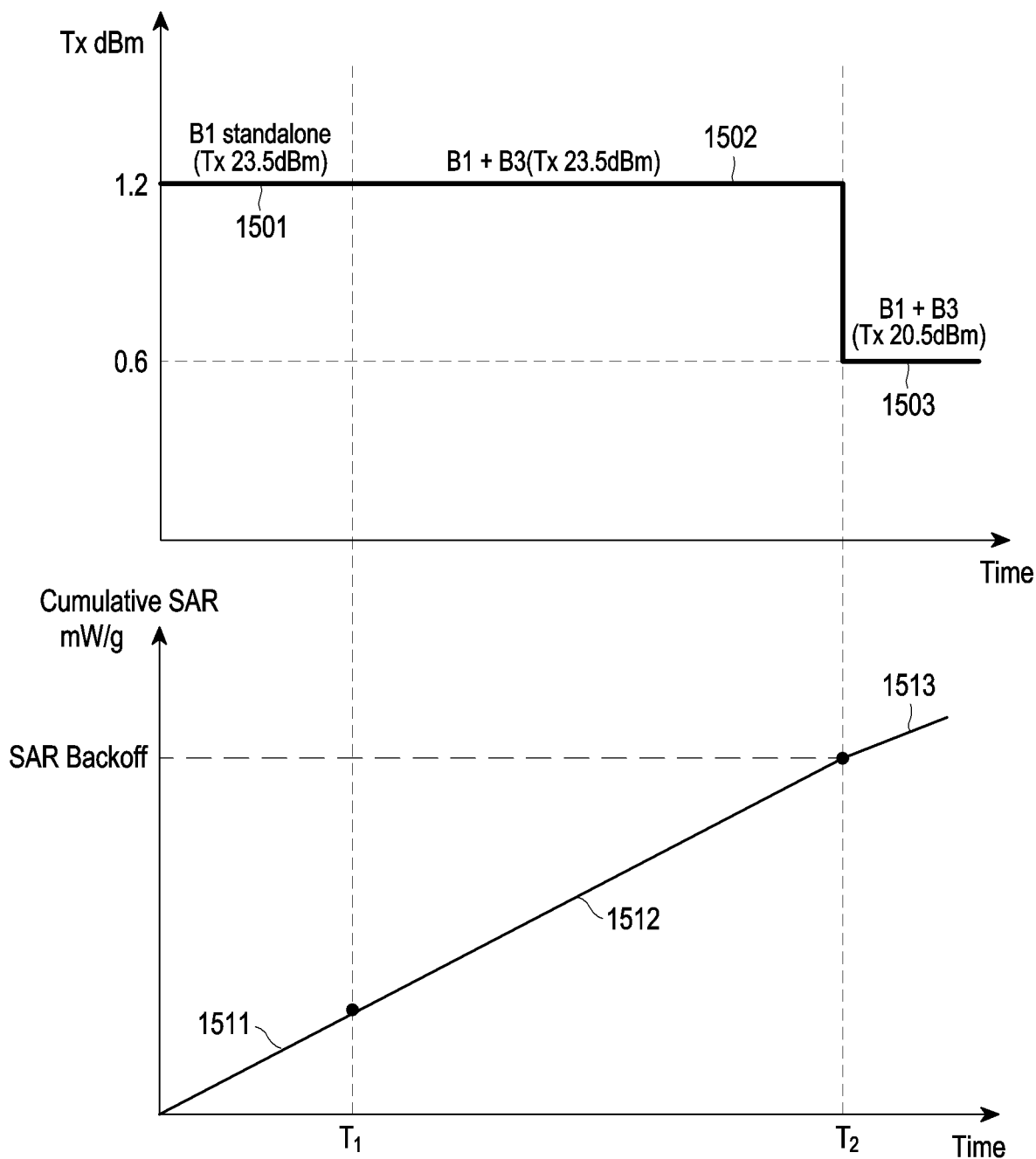
FIG. 15A is a diagram including graphs illustrating backoff according to a comparative example.
Figure 15B:
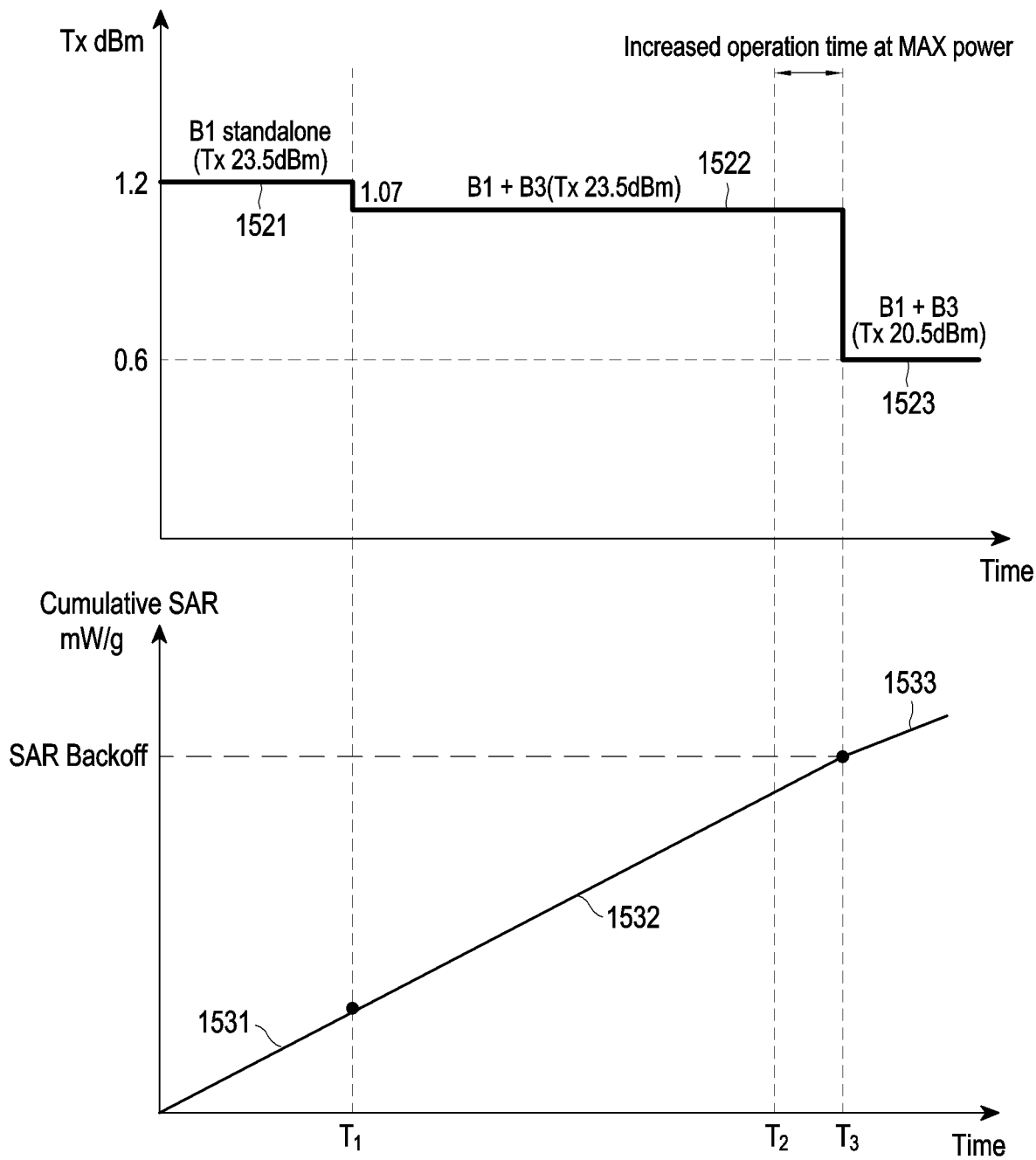
FIG. 15B is a diagram including graphs illustrating backoff according to various embodiments.

FIG. 15A is a diagram including graphs illustrating backoff according to a comparative example. FIG. 15B is a diagram including graphs illustrating backoff according to various embodiments.

Referring to FIG. 15A, in the comparative example, the electronic device 101 may perform standalone operation in the B1 band during the interval corresponding to t<T1. In the comparative example, the electronic device 101 may identify that an SAR 1501 of 1.2 mW/g per unit time has been raised at t<T1. A cumulative SAR 1511 may increase at a first rate. The electronic device 101 may transmit a communication signal via CA of the B1 band and B3 band during the interval corresponding to T1≤t<T2. In the comparative example, the electronic device 101 may identify that an SAR 1502 of 1.2 mW/g per unit time has been raised at T1≤t<T2. A cumulative SAR 1512 may increase at the first rate. The electronic device 101 may identify that the cumulative SAR almost reaches a backoff threshold (SAR backoff), and may back off the transmission strength of a communication signal. The electronic device 101 may back off the transmission strength to, for example, 20.5 dBm, and may identify that an SAR 1503 of 0.6 mW/g per unit time is raised at t>T2. A cumulative SAR 1513 may increase at a second rate.

According to various embodiments, the electronic device 101 may perform standalone operation in the B1 band in the interval corresponding to t<T1. The electronic device 101 may identify that an SAR 1521 of 1.2 mW/g per unit time has been raised at t<T1. A cumulative SAR 1531 may increase at a first rate. The electronic device 101 may transmit a communication signal via CA of the B1 band and the B3 band during the interval corresponding to T1≤t<T3. The electronic device 101 may identify that an SAR 1522 of 1.07 mW/g per unit time has been raised at T1≤t<T3. The electronic device 101, for example, may change an antenna configuration by CA, and may identify an actual SAR of 1.07 mW/g corresponding to the changed antenna configuration. A cumulative SAR 1532 may increase at a third rate. The electronic device 101 may identify that the cumulative SAR almost reaches a backoff threshold (SAR backoff) at T3, which is later than T2, and may back off the transmission strength of a communication signal. The electronic device 101 may back off the transmission strength to, for example, 20.5 dBm, and may identify that an SAR 1503 of 0.6 mW/g per unit time is raised at t>T3. A cumulative SAR 1533 may increase at a second rate. Accordingly, the amount of time that allows operation at the maximum power (max power), before backoff, may be increased by T3−T2.

According to various example embodiments, an electronic device may include: a memory storing a plurality of antenna configurations, at least one communication processor configured to support at least one network communication, at least one antenna configured to transmit at least one communication signal corresponding to the at least one network communication, and at least one antenna-tuning circuit configured to adjust resonance characteristics of the at least one antenna, wherein the at least one communication processor is configured to: identify a cumulative specific absorption rate (SAR) value associated with emission of the at least one communication signal based on an antenna configuration of the at least one antenna-tuning circuit among the plurality of antenna configurations; and adjust a transmission strength of a communication signal corresponding to at least one of the at least one network communication based on the cumulative SAR value satisfying a designated condition.

According to various example embodiments, the at least one communication processor is further configured to: identify at least one actual SAR raised by each of the at least one communication signal based on at least one antenna configuration based on each of the at least one communication signal being transmitted; and identify the cumulative SAR value based on the at least one actual SAR.

According to various example embodiments, the at least one communication processor is further configured to identify at least one antenna efficiency corresponding to the at least one antenna configuration.

According to various example embodiments, the at least one communication processor is further configured to identify the at least one actual SAR based on a maximum SAR at a maximum signal strength of the at least one communication signal, an antenna efficiency corresponding to the maximum SAR, a transmission strength of the at least one communication signal, and the at least one antenna efficiency.

According to various example embodiments, the at least one communication processor is further configured to: identify correlation information between a communication environment and an actual SAR; and identify the at least one actual SAR based on the correlation information and a communication environment based on the at least one communication signal being transmitted.

According to various example embodiments, the communication environment may include at least one of a transmission frequency or a modulation scheme.

According to various example embodiments, the at least one communication processor is further configured to adjust the transmission strength of the communication signal based on a total cumulative SAR value during a designated period of time at at least one point in time in the future being identified as exceeding a threshold cumulative value based on the cumulative SAR value.

According to various example embodiments, the at least one communication processor is further configured to identify a plurality of tables, each including information associated with a consumed SAR value during the designated period of time. The plurality of tables correspond to a plurality of points in time in the future, respectively. The at least one communication processor is configured to adjust the transmission strength of the communication signal based on identifying that a table of which a consumed SAR value during the designated period of time exceeds the threshold cumulative value exists among the plurality of tables.

According to various example embodiments, with respect to each of the plurality of tables, the at least one communication processor is further configured to: identify a sum of a cumulative SAR value corresponding to at least one point in time in the past, a maximum SAR value corresponding to a present point in time, and an estimated SAR value expected to be consumed at at least one point in time in the future which are included in the plurality of tables; and identify whether a table having a sum exceeding the threshold cumulative value exists.

According to various example embodiments, the at least one communication processor is further configured to: in response to identifying that a designated timer time expires, discard an initial table of the plurality of tables, update remaining tables, and generate a new table, wherein the remaining tables are updated by shifting, by the designated timer time, data associated with a plurality of points in time included therein.

According to various example embodiments, method of operating an electronic device, which includes a memory storing a plurality of antenna configurations, at least one communication processor configured to support at least one network communication, at least one antenna configured to transmit at least one communication signal corresponding to the at least one network communication, and at least one antenna-tuning circuit configured to adjust a resonance characteristic of the at least one antenna, includes: identifying, by the at least one communication processor, a cumulative specific absorption rate (SAR) value associated with emission of the at least one communication signal based on an antenna configuration of the at least one antenna-tuning circuit among the plurality of antenna configurations; and adjusting, by the at least one communication processor, a transmission strength of a communication signal corresponding to at least one of the at least one network communication based on the cumulative SAR value satisfying a designated condition.

According to various example embodiments, the operation of identifying the cumulative SAR value may include: identifying at least one actual SAR raised by each of the at least one communication signal based on at least one antenna configuration based on each of the at least one communication signal being transmitted; and identifying the cumulative SAR value based on the at least one actual SAR.

According to various example embodiments, the operation of identifying the actual SAR may further include identifying at least one antenna efficiency corresponding to the at least one antenna configuration.

According to various example embodiments, the operation of identifying the at least one actual SAR may include identifying the at least one actual SAR based on a maximum SAR at a maximum signal strength of the at least one communication signal, an antenna efficiency corresponding to the maximum SAR, a transmission strength of the at least one communication signal, and the at least one antenna efficiency.

According to various example embodiments, the operation of identifying the actual SAR may include: identifying correlation information between a communication environment and an actual SAR; and identifying the at least one actual SAR based on the correlation information and a communication environment when the at least one communication signal is transmitted.

According to various example embodiments, the communication environment may include at least one of a transmission frequency or a modulation scheme.

According to various example embodiments, the operation of adjusting the transmission strength of the communication signal corresponding to at least one of the at least one network communication, based on the fact that the cumulative SAR value satisfies the designated condition, may include: adjusting the transmission strength of the communication signal based on a total cumulative SAR value during a designated period of time at at least one point in time in the future being identified as exceeding a threshold cumulative value based on the cumulative SAR value.

According to various example embodiments, the operation of adjusting the transmission strength of the communication signal corresponding to at least one of the at least one network communication based on the cumulative SAR value satisfying the designated condition, may include identifying a plurality of tables, each including information associated with a consumed SAR value during the designated period of time. The plurality of tables corresponds to a plurality of future time points, respectively. The operation of adjusting the transmission strength of the communication signal corresponding to at least one of the at least one network communication, based on the cumulative SAR value satisfying the designated condition, may include adjusting the transmission strength of the communication signal based on identifying that a table of which a consumed SAR value during the designated period of time exceeds the threshold cumulative value exists among the plurality of tables.

According to various example embodiments, the operation of adjusting the transmission strength of the communication signal based on identifying that a table of which a consumed SAR value during the designated period of time exceeds the threshold cumulative value exists among the plurality of tables, may include: with respect to each of the plurality of tables, identifying a sum of a cumulative SAR value corresponding to at least one point in time in the past, a maximum SAR value corresponding to a present point in time, and an estimated SAR value which is expected to be consumed at at least one point in time in the future, which are included in the plurality of tables; and identifying whether a table that has a sum exceeding the threshold cumulative value exists.

According to various example embodiments, an electronic device may include: a memory storing a plurality of antenna configurations, at least one communication processor configured to support at least one network communication, at least one antenna configured to transmit at least one communication signal corresponding to the at least one network communication, and at least one antenna-tuning circuit configured to adjust a resonance characteristic of the at least one antenna, wherein the at least one communication processor is configured to: identify a first target transmission strength of the at least one communication signal; based on an antenna configuration of the antenna-tuning circuit being controlled to be a first antenna configuration among the plurality of antenna configurations, control the at least one antenna to transmit at least one first communication signal based on the first target transmission strength during a first period of time, and control the at least one antenna to transmit at least one second communication signal based on a backoff signal strength after the first period of time; and based on an antenna configuration of the antenna-tuning circuit being controlled to be a second antenna configuration among the plurality of antenna configurations, control the at least one antenna to transmit at least one third communication signal based on the first target transmission strength during a second period of time, and control the at least one antenna to transmit at least one fourth communication signal based on a backoff signal strength after the second period of time.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., master device or task performing device). For example, a processor (e.g., the processor) of the machine (e.g., master device or task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. An electronic device, comprising:
 a memory storing settings for a plurality of antenna configurations;
 at least one communication processor configured to support at least one network communication;

at least one antenna configured to transmit at least one communication signal corresponding to the at least one network communication; and at least one antenna-tuning circuit comprising an aperture-tuning circuit and an impedance-tuning circuit, and configured to control settings of the aperture-tuning circuit and the impedance-tuning circuit to adjust a resonance characteristic of the at least one antenna corresponding on the stored settings for the plurality of antenna configurations, wherein the at least one communication processor is configured to:

identify a cumulative specific absorption rate (SAR) value associated with emission of the at least one communication signal based on a set antenna configuration of the at least one antenna-tuning circuit among the plurality of antenna configurations, wherein the cumulative SAR value includes a sum of: an SAR value corresponding to a plurality of past points in time, a maximum SAR value corresponding to a present point in time and an estimated SAR value expected to be consumed at a plurality of future points in time; and adjust a transmission strength of a communication signal corresponding to at least one of the at least one network communication based on the cumulative SAR value satisfying a designated condition.

2. The electronic device of claim 1, wherein the at least one communication processor is further configured to:

identify at least one actual SAR raised by each of the at least one communication signal based on at least one antenna configuration based on each of the at least one communication signal being transmitted; and identify the cumulative SAR value, based on the at least one actual SAR.

3. The electronic device of claim 2, wherein the at least one communication processor is further configured to identify at least one antenna efficiency corresponding to the at least one antenna configuration.

4. The electronic device of claim 3, wherein the at least one communication processor is further configured to identify the at least one actual SAR based on a maximum SAR at a maximum signal strength of the at least one communication signal, an antenna efficiency corresponding to the maximum SAR, a transmission strength of the at least one communication signal, and the at least one antenna efficiency.

5. The electronic device of claim 2, wherein the at least one communication processor is further configured to:

identify correlation information between a communication environment and an actual SAR; and identify the at least one actual SAR based on the correlation information and a communication environment based on the at least one communication signal being transmitted.

6. The electronic device of claim 5, wherein the communication environment comprises at least one of a transmission frequency or a modulation scheme.

7. The electronic device of claim 1, wherein the at least one communication processor is further configured to adjust the transmission strength of the communication signal based on a total cumulative SAR value during a designated period of time at at least one future point in time being identified as exceeding a threshold cumulative value based on the cumulative SAR value.

8. The electronic device of claim 7, wherein the at least one communication processor is further configured to:

identify a plurality of tables, each including information associated with a consumed SAR value during the designated period of time, wherein the plurality of tables correspond to a plurality of future points in time, respectively; and adjust the transmission strength of the communication signal based on identifying that a table of which a consumed SAR value during the designated period of time exceeds the threshold cumulative value exists among the plurality of tables.

9. The electronic device of claim 8, wherein the at least one communication processor is further configured to:

in response to identifying that a designated timer time expires, discard an initial table of the plurality of tables, update remaining tables, and generate a new table, wherein the remaining tables are updated by shifting, by the designated timer time, data associated with a plurality of points in time included therein.

10. A method of operating an electronic device, which comprises a memory storing a plurality of antenna configurations, at least one communication processor configured to support at least one network communication, at least one antenna configured to transmit at least one communication signal corresponding to the at least one network communication, and at least one antenna-tuning circuit comprising an aperture-tuning circuit and an impedance-tuning circuit and configured to control settings of the aperture-tuning circuit and the impedance-tuning circuit to adjust a resonance characteristic of the at least one antenna corresponding on the stored settings for the plurality of antenna configurations, the method comprising:

identifying, by the at least one communication processor, a cumulative specific absorption rate (SAR) value associated with emission of the at least one communication signal based on a set antenna configuration of the at least one antenna-tuning circuit among the plurality of antenna configurations, wherein the cumulative SAR value includes a sum of: an SAR value corresponding to a plurality of past points in time, a maximum SAR value corresponding to a present point in time and an estimated SAR value expected to be consumed at a plurality of future points in time; and adjusting, by the at least one communication processor, a transmission strength of a communication signal corresponding to at least one of the at least one network communication based on the cumulative SAR value satisfying a designated condition.

11. The method of claim 10, wherein the identifying the cumulative SAR value comprises:

identifying at least one actual SAR raised by each of the at least one communication signal based on at least one antenna configuration based on each of the at least one communication signal being transmitted; and identifying the cumulative SAR value based on the at least one actual SAR.

12. The method of claim 11, wherein the identifying the actual SAR further comprises:

identifying at least one antenna efficiency corresponding to the at least one antenna configuration.

13. The method of claim 12, wherein the identifying the at least one actual SAR comprises:

identifying the at least one actual SAR based on a maximum SAR at a maximum signal strength of the at least one communication signal, an antenna efficiency corresponding to the maximum SAR, a transmission strength of the at least one communication signal, and the at least one antenna efficiency.

14. The method of claim 11, wherein the identifying the actual SAR comprises:
  identifying correlation information between a communication environment and an actual SAR; and
  identifying the at least one actual SAR based on the correlation information and a communication environment based on the at least one communication signal being transmitted.

15. The method of claim 14, wherein the communication environment comprises at least one of a transmission frequency or a modulation scheme.

16. The method of claim 10, wherein the adjusting the transmission strength of the communication signal corresponding to at least one of the at least one network communication based on the cumulative SAR value satisfying the designated condition, comprises:
  adjusting the transmission strength of the communication signal based on a total cumulative SAR value during a designated period of time at at least one future point in time being identified as exceeding a threshold cumulative value based on the cumulative SAR value.

17. The method of claim 16, wherein the adjusting the transmission strength of the communication signal corresponding to at least one of the at least one network communication based on the cumulative SAR value satisfying the designated condition, comprises:
  identifying a plurality of tables, each including information associated with a consumed SAR value during the designated period of time, wherein the plurality of tables correspond to a plurality of future points in time, respectively; and
  adjusting the transmission strength of the communication signal based on identifying that a table of which a consumed SAR value during the designated period of time exceeds the threshold cumulative value exists among the plurality of tables.

18. An electronic device, comprising:
  a memory storing settings for a plurality of antenna configurations;
  at least one communication processor configured to support at least one network communication;
  at least one antenna configured to transmit at least one communication signal corresponding to the at least one network communication; and
  at least one antenna-tuning circuit comprising an aperture-tuning circuit and an impedance-tuning circuit, and configured to control settings of the aperture-tuning circuit and the impedance-tuning circuit to adjust a resonance characteristic of the at least one antenna corresponding on the stored settings for the plurality of antenna configurations,
  wherein the at least one communication processor is configured to:
  identify a first target transmission strength of the at least one communication signal;
  based on an antenna configuration of the antenna-tuning circuit being controlled to be a first antenna configuration among the plurality of antenna configurations, the first antenna configuration providing a first setting for the aperture-tuning circuit and a first setting for the impedance-tuning circuit:
    control the at least one antenna to transmit at least one first communication signal based on the first target transmission strength during a first period of time, and
    control the at least one antenna to transmit at least one second communication signal, based on a backoff signal strength after the first period of time; and
  based on an antenna configuration of the antenna-tuning circuit being controlled to be a second antenna configuration among the plurality of antenna configurations, the second antenna configuration providing a second setting for the aperture-tuning circuit and a second setting for the impedance-tuning circuit:
    control the at least one antenna to transmit at least one third communication signal based on the first target transmission strength during a second period of time, and
    control the at least one antenna to transmit at least one fourth communication signal based on a backoff signal strength after the second period of time.

* * * * *